(12) United States Patent
Kozawa et al.

(10) Patent No.: US 9,774,442 B2
(45) Date of Patent: Sep. 26, 2017

(54) COMMUNICATION DEVICE

(71) Applicant: DENSO CORPORATION, Kariya, Aichi-pref. (JP)

(72) Inventors: Takaharu Kozawa, Kariya (JP); Hideki Kabune, Kariya (JP); Toshihiro Fujita, Kariya (JP); Katsuhiko Hayashi, Kariya (JP); Kouichi Nakamura, Kariya (JP); Shuji Kuramitsu, Kariya (JP); Toshimitsu Sakai, Kariya (JP); Masaya Taki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/086,643

(22) Filed: Mar. 31, 2016

(65) Prior Publication Data

US 2016/0294539 A1 Oct. 6, 2016

(30) Foreign Application Priority Data

Apr. 3, 2015 (JP) .................................. 2015-76873
Feb. 19, 2016 (JP) ................................ 2016-029839

(51) Int. Cl.
*H04L 7/00* (2006.01)
*G06F 13/40* (2006.01)
(Continued)

(52) U.S. Cl.
CPC ............ *H04L 7/0041* (2013.01); *G06F 13/40* (2013.01); *H04J 3/0638* (2013.01); *H04L 12/40* (2013.01);
(Continued)

(58) Field of Classification Search
CPC ..... B62D 5/049; B62D 5/0463; H04L 7/0041; H04L 12/40; H04L 25/49; H04Q 9/04; H04J 3/0638; G06F 13/40
(Continued)

(56) References Cited

U.S. PATENT DOCUMENTS 4,367,414 A * 1/1983 Miller
5,740,040 A * 4/1998 Kifuku
(Continued)

FOREIGN PATENT DOCUMENTS

JP 2002-333474 A 11/2002
JP 2014-210472 A 11/2014
(Continued)

OTHER PUBLICATIONS

Emulation of Automotive Communication Protocol Sent , IJCTT, Jun. 2013.*
(Continued)

*Primary Examiner* — Daniel Washburn
*Assistant Examiner* — Berhanu Tadese
(74) *Attorney, Agent, or Firm* — Knobbe, Martens, Olson & Bear, LLP

(57) ABSTRACT

A communication device includes: a plurality of sensors, each of which includes at least one sensor element that detects information relating to a single detection target and an output circuit that generates an output signal based on a detection signal of the sensor element and transmits the output signal; and a controller that acquires the output signal. One of the sensors transmits the output signal to the controller at an output timing that is shifted, by a predetermined period shorter than a length of one period of the output signal, from another output timing when another one of the sensors transmits the output signal.

13 Claims, 19 Drawing Sheets

(51) Int. Cl.
*H04J 3/06* (2006.01)
*H04L 12/40* (2006.01)
*H04L 25/49* (2006.01)
*H04Q 9/04* (2006.01)
*H04L 29/08* (2006.01)

(52) U.S. Cl.
CPC .............. *H04L 25/49* (2013.01); *H04Q 9/04* (2013.01); *H04L 67/12* (2013.01); *H04Q 2209/845* (2013.01)

(58) Field of Classification Search
USPC ........................................................ 375/356
See application file for complete search history.

(56) References Cited

U.S. PATENT DOCUMENTS

| | | | | |
|---|---|---|---|---|
| 6,386,052 | B1* | 5/2002 | Satoh | |
| 8,994,369 | B2* | 3/2015 | Vig | G01P 3/488 324/175 |
| 9,151,771 | B2* | 10/2015 | Vig | G01P 3/488 |
| 9,172,565 | B2* | 10/2015 | Cadugan | H04L 7/042 |
| 9,383,425 | B2* | 7/2016 | Milano | G01R 33/072 |
| 2004/0079922 | A1* | 4/2004 | Yokokouji | |
| 2008/0159467 | A1* | 7/2008 | Kassner | |
| 2008/0312860 | A1* | 12/2008 | Bauerle | |
| 2009/0267673 | A1* | 10/2009 | Kamenicky | |
| 2010/0114452 | A1* | 5/2010 | Bauerle | |
| 2011/0310954 | A1* | 12/2011 | Sawaoka | |
| 2012/0036922 | A1* | 2/2012 | Bauerle | |
| 2012/0093312 | A1* | 4/2012 | Gammel | |
| 2012/0158335 | A1* | 6/2012 | Donovan | |
| 2013/0335072 | A1* | 12/2013 | Malzfeldt | G01D 5/145 324/207.21 |
| 2013/0345924 | A1* | 12/2013 | Tomar | |
| 2015/0066301 | A1* | 3/2015 | Kozawa | B62D 5/049 701/41 |
| 2015/0077025 | A1* | 3/2015 | Suzuki | B62D 5/0463 318/400.02 |
| 2015/0194992 | A1* | 7/2015 | Rasbornig | H04B 1/16 375/316 |
| 2015/0229469 | A1* | 8/2015 | Hainz | H04L 7/0332 375/225 |
| 2015/0236876 | A1* | 8/2015 | Cadugan | H04L 7/042 375/242 |
| 2016/0247391 | A1* | 8/2016 | Wagner | H04Q 9/00 |
| 2016/0355211 | A1* | 12/2016 | Suzuki | B62D 5/0457 |
| 2016/0362137 | A1* | 12/2016 | Taki | B62D 6/002 |

FOREIGN PATENT DOCUMENTS

| | | | | |
|---|---|---|---|---|
| WO | WO 2016077065 A1 * | 5/2016 | ......... | G01R 31/2884 |
| WO | WO 2016077066 A1 * | 5/2016 | ............. | G01R 33/09 |

OTHER PUBLICATIONS

Digital Temperature Sensor with I.sup.2C.TM. Interface; Burr-Brown Products from Texas Instruments; TMP100, TMP101; XP-002671327; Jan. 2002—revised Nov. 2007; Package Option Addendum dated Aug. 20, 2011; 19 pages.*

"Single Edge Nibble Transmission for Automotive Applications;" SAE International; Surface Vehicle Information Report; SAE J2716JAN2010; XP-008149400; dated Apr. 2007, revised Jan. 2010; pp. 1-56.*

Anthony Seely, Multi-Channel SAE-J2716 (SENT) Decoder Using NHET, Texas Instruments MCU Automotive Systems, Jul. 2010.*

Digital Temperature Sensor with I.sup.2C.TM. Interface; Burr-Brown Products from Texas Instruments; TMP100, TMP100, TMP101; XP-002671327; Jan. 2002-revised Nov. 2007; Package Option Addendum dated Aug. 20, 2011; 19 pages.*

Texas Instruments Multi-Channel SAE-J2716 (SENT) Decoder Using NHET by Seely, Anthony, 19 pages, Jul. 2010 available online @ http://www.ti.com/lit/an/sprab22/sprab22.pdf: last accessed on Feb. 20, 2017.*

U.S. Appl. No. 15/178,414, Office Action, dated Feb. 28, 2017, in 21 pages.

* cited by examiner

COMMUNICATION DEVICE

CROSS REFERENCE TO RELATED APPLICATIONS

This application is based on Japanese Patent Applications No. 2015-76873 filed on Apr. 3, 2015, and No. 2016-29839 filed on Feb. 19, 2016, the disclosures of which are incorporated herein by reference.

TECHNICAL FIELD

The present disclosure relates to a communication device.

BACKGROUND

Conventionally, there has been known a communication device that transmits sensor data to a controller. For example, in Patent Literature 1, the transmissions of sensor data are synchronized by a trigger signal that is generated by a controller and received by a bidirectional node.

When a control unit simultaneously acquires signals from a plurality of sensor sections, a data update period in the control unit becomes equal to a signal period. In this case, it is not possible to make the data update period in the control unit shorter than the signal period.

PRIOR ART LITERATURE

Patent Literature

Patent Literature 1: JP-2013-546096-A (corresponding to US 2012/0158335)

SUMMARY

It is an object of the present disclosure to provide a communication device that enables an improvement in an update frequency of data in a control unit.

According to an aspect of the present disclosure, a communication device includes: a plurality of sensors, each of which includes at least one sensor element that detects information relating to a single detection target and an output circuit that generates an output signal based on a detection signal of the sensor element and transmits the output signal; and a controller that acquires the output signal. One of the sensors transmits the output signal to the controller at an output timing that is shifted, by a predetermined period shorter than a length of one period of the output signal, from another output timing when another one of the sensors transmits the output signal.

In the present disclosure, timings of outputting output signals from the plurality of sensors are shifted from each other by a predetermined period. Thus, an update frequency of data in the controller can be improved, as compared with the case when output signals are simultaneously output from a plurality of sensors.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Hereinbelow, a communication device according to the present disclosure will be described with reference to the drawings. In the following embodiments, substantially identical elements are denoted by identical reference signs, and description thereof is omitted.

First Embodiment

A first embodiment of the present disclosure will be described with reference to FIGS. 1 to 8.

Figure 1:
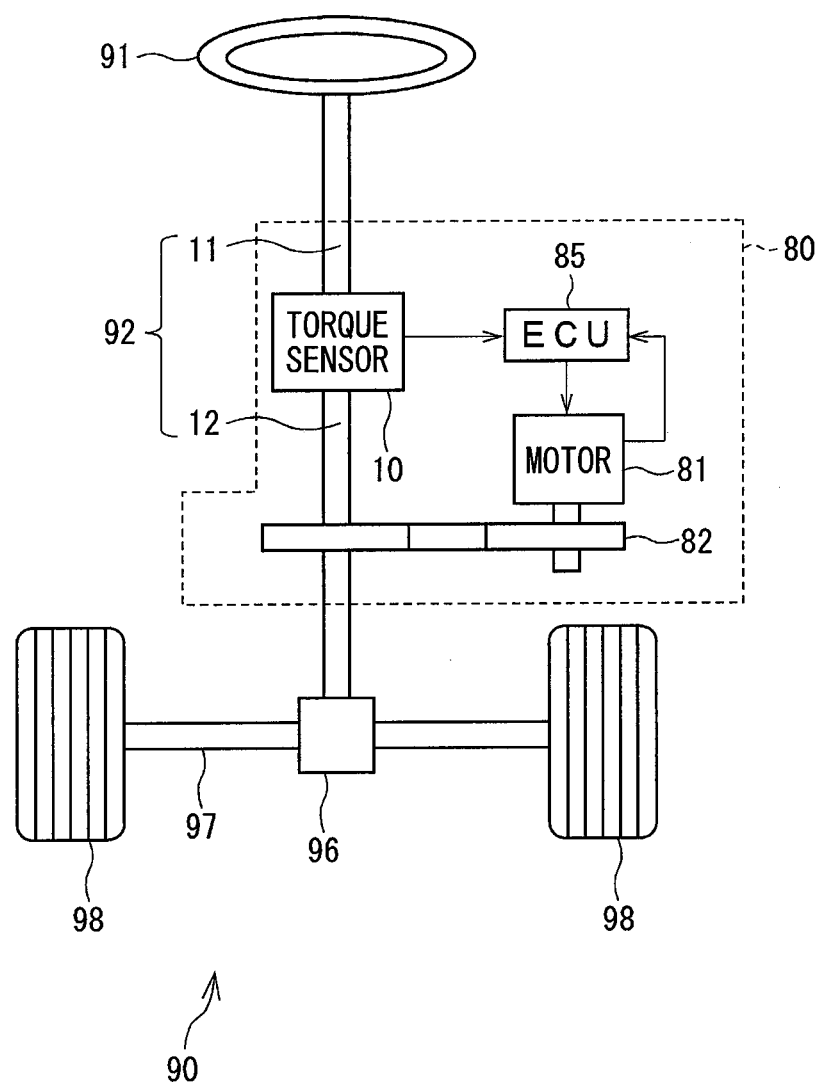
FIG. 1 is a schematic configuration diagram illustrating the configuration of an electric power steering device according to a first embodiment of the present disclosure.
Figure 2:
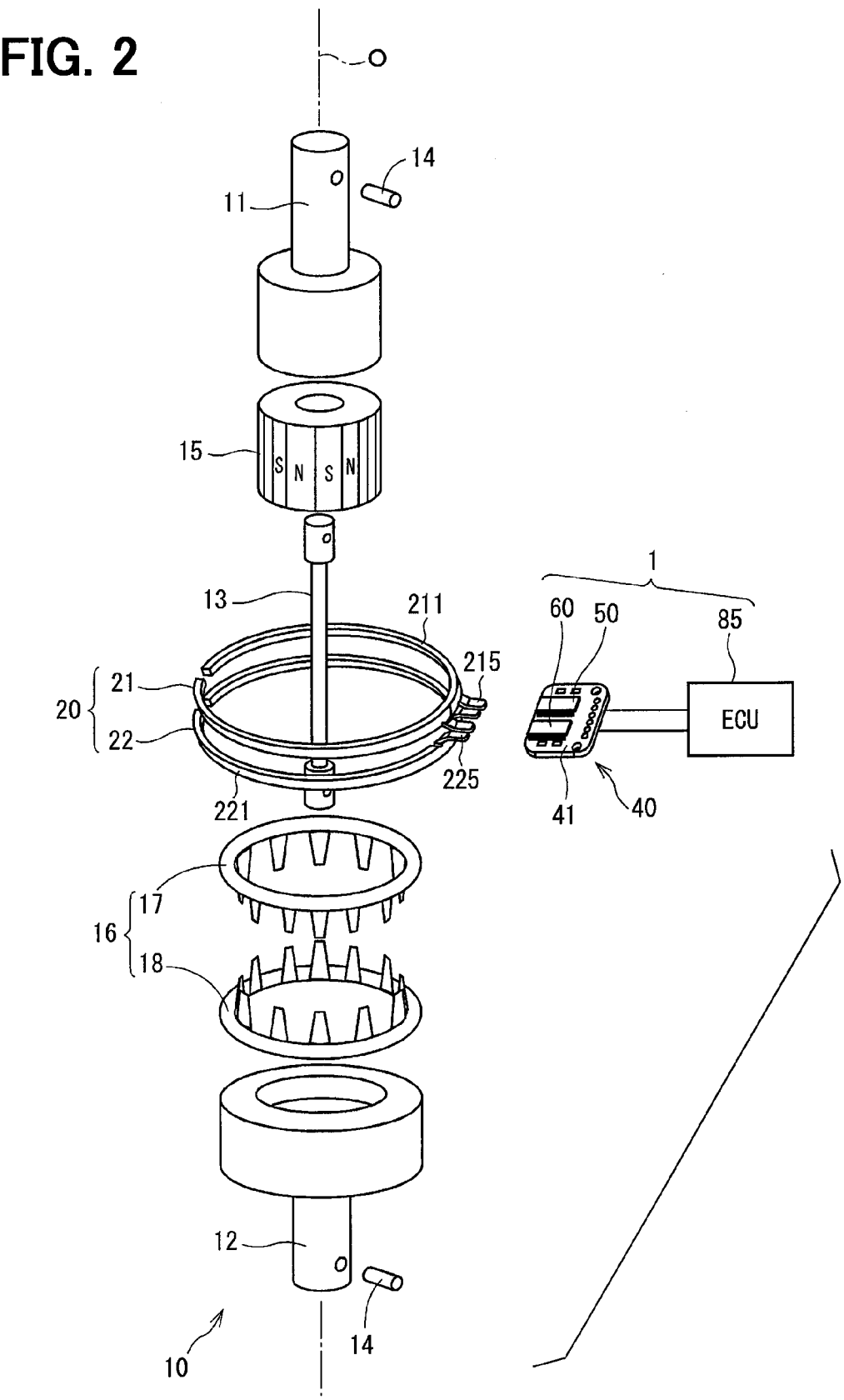
FIG. 2 is an exploded perspective view illustrating a torque sensor according to the first embodiment of the present disclosure.

As illustrated in FIGS. 1 and 2, a communication device 1 is provided with a main magnetic sensor 50, a sub magnetic sensor 60, and an ECU 85 as a control unit. The communication device is applied to, for example, an electric power steering device 80 which is used for assisting a steering operation of a vehicle.

FIG. 1 illustrates the entire configuration of a steering system 90 which is provided with the electric power steering device 80.

A steering wheel 91 is connected to a steering shaft 92.

The steering shaft 92 includes an input shaft 11 as a first shaft and an output shaft 12 as a second shaft. The input shaft 11 is connected to the steering wheel 91. A torque sensor 10 which detects torque applied to the steering shaft 92 is disposed between the input shaft 11 and the output shaft 12. A pinion gear 96 is disposed on an end of the output shaft 12, the end being located opposite to the input shaft 11. The pinion gear 96 meshes with a rack shaft 97. A pair of wheels 98 are coupled to both ends of the rack shaft 97 through, for example, a tie rod.

When a driver rotates the steering wheel 91, the steering shaft 92 connected to the steering wheel 91 rotates. The rotational motion of the steering shaft 92 is converted into a linear motion of the rack shaft 97 by the pinion gear 96, so that the pair of wheels 98 is steered to an angle responsive to a displacement amount of the rack shaft 97.

The electric power steering device 80 is provided with a motor 81 which outputs auxiliary torque for assisting the steering of the steering wheel 91 by a driver, a deceleration gear 82, the torque sensor 10, and the ECU 85. Although, in FIG. 1, the motor 81 and the ECU 85 are separately provided, the motor 81 and the ECU 85 may be integrated.

The deceleration gear 82 decelerates the rotation of the motor 81 and transmits the decelerated rotation to the steering shaft 92. That is, the electric power steering device 80 of the present embodiment is a so-called "column assist type" electric power steering device, but may be a so-called "rack assist type" electric power steering device which transmits the rotation of the motor 81 to the rack shaft 97.

Figure 4:
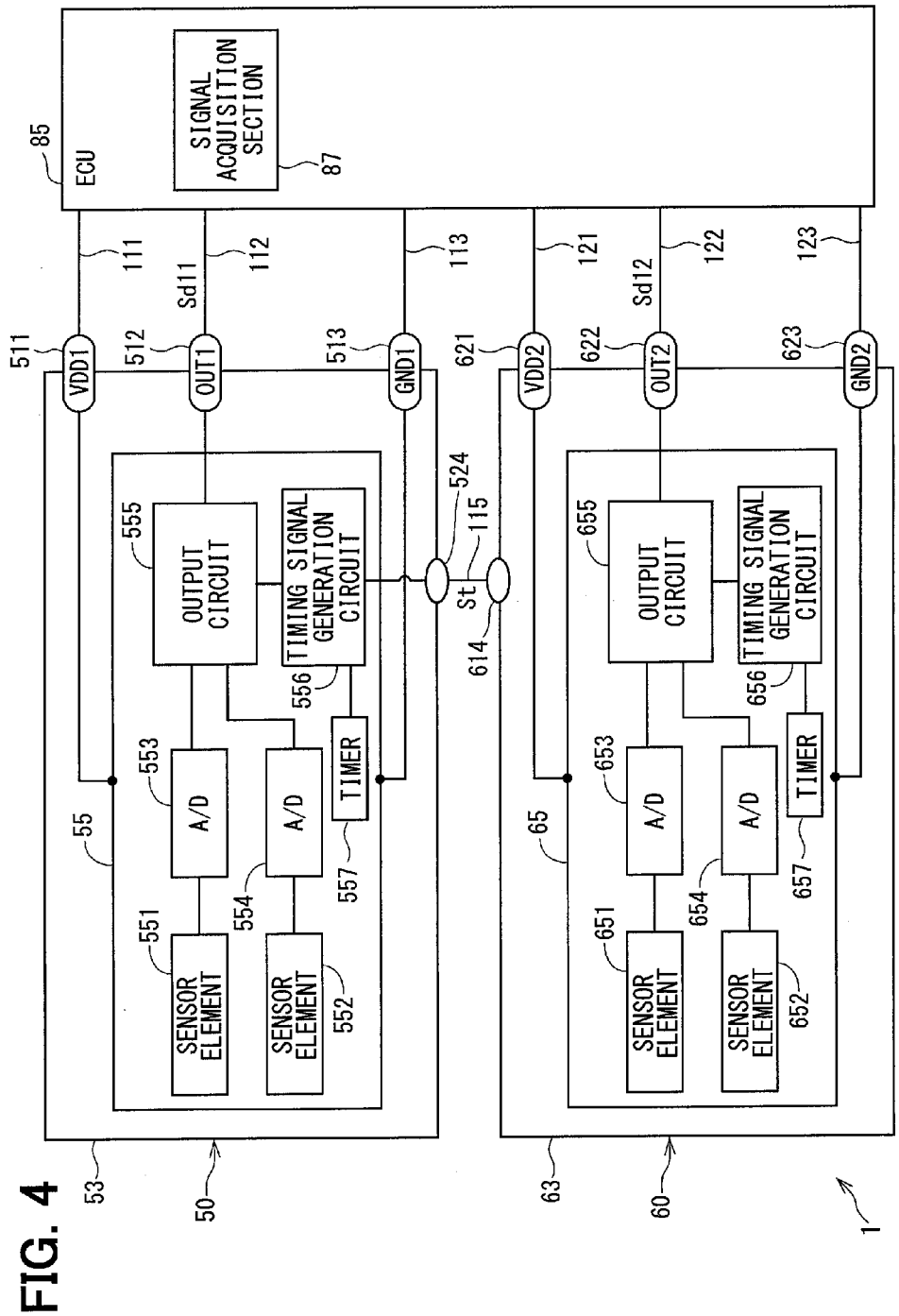
FIG. 4 is a block diagram illustrating a communication device according to the first embodiment of the present disclosure.

The ECU 85 includes a signal acquisition section 87 as a function block (refer to FIG. 4). The signal acquisition section 87 acquires output signals Sd11, Sd12 output from the magnetic sensors 50, 60. The ECU 85 controls the drive of the motor 81 in accordance with a steering torque that is calculated on the basis of the output signals Sd11, Sd12. Each processing in the ECU 85 may be software processing performed by executing a previously stored program by a CPU or may be hardware processing performed by a dedicated electronic circuit. The same applies to an ECU 86 (described below).

The magnetic sensors 50, 60 and the ECU 85 will be described in detail below.

As illustrated in FIG. 2, the torque sensor 10 is provided with the input shaft 11, the output shaft 12, a torsion bar 13, a multipole magnet 15, a magnetic yoke 16, a magnetism collection module 20, and a sensor unit 40.

One end of the torsion bar 13 is fixed to the input shaft 11 with a pin 14 and the other end of the torsion bar 13 is fixed to the output shaft 12 with a pin 14, so that the torsion bar 13 couples the input shaft 11 and the output shaft 12 to each other on the same axis of a rotation axis O. The torsion bar 13 is a bar-like elastic member and converts a torque applied to the steering shaft 92 into torsional displacement.

The multipole magnet 15 is formed in a cylindrical shape and fixed to the input shaft 11. The multipole magnet 15 is magnetized with the north poles (N poles) and the south poles (S poles) alternately in the circumferential direction.

The multipole magnet 15 may have any number of poles. In the present embodiment, the multipole magnet 15 has twenty-four poles in total including twelve N poles and twelve S poles.

The magnetic yoke 16 is held by a yoke holding member (not illustrated) which is formed of a nonmagnetic material such as resin and forms a magnetic circuit in a magnetic field generated by the multipole magnet 15.

The magnetic yoke 16 includes a first yoke 17 which is disposed at a side corresponding to the input shaft 11 and a second yoke 18 which is disposed at a side corresponding to the output shaft 12. Both the first yoke 17 and the second yoke 18 are formed of a soft magnetic material in an annular shape and fixed to the output shaft 12 on the outer side in the radial direction of the multipole magnet 15.

The magnetism collection module 20 includes magnetism collection rings 21, 22. The magnetism collection rings 21, 22 are disposed on the outer side in the radial direction of the magnetic yoke 16 to collect magnetic fluxes from the magnetic yoke 16. The first magnetism collection ring 21 is disposed at the side corresponding to the input shaft 11, and the second magnetism collection ring 22 is disposed at the side corresponding to the output shaft 12. The first magnetism collection ring 21 and the second magnetism collection ring 22 are held by a magnetism collection ring holding member (not illustrated) by insert molding.

The first magnetism collection ring 21 is formed of a soft magnetic material, and includes a ring section 211 which is formed in a substantially annular shape and two magnetism collection sections 215 which project outward in the radial direction from the ring section 211. The magnetism collection sections 215 are formed according to the number of sensor sections 55, 65 as sensors (described below). Similarly to the first magnetism collection ring 21, the second magnetism collection ring 22 is formed of a soft magnetic material, and includes a ring section 221 which is formed in a substantially annular shape and two magnetism collection sections 225 which project outward in the radial direction from the ring section 221. In the present embodiment, the first magnetism collection ring 21 and the second magnetism collection ring 22 have substantially the same shape.

Opposed faces between the magnetism collection sections 215 of the first magnetism collection ring 21 and the magnetism collection sections 225 of the second magnetism collection ring 22 are substantially parallel to each other. The magnetic sensors 50, 60 are disposed between the magnetism collection sections 215, 225.

The sensor unit 40 includes a substrate 41 and the magnetic sensors 50, 60.

The substrate 41 is formed in a substantially rectangular plate-like shape, and the magnetic sensors 50, 60 are mounted on the substrate 41. The magnetic sensors 50, 60 are mounted on the same face of the substrate 41.

The magnetic sensors 50, 60 detect a magnetic flux density responsive to a torsional displacement amount and a torsional displacement direction of the torsion bar 13 and output the output signals Sd11, Sd12 to the ECU 85. The main magnetic sensor 50 and the sub magnetic sensor 60 have substantially the same configuration and are mounted on the substrate 41 side by side in the same direction. Each of the magnetic sensors 50, 60 has an EEPROM (not illustrated) inside thereof, and whether to function as a main sensor or a sub sensor is previously set in the EEPROM. In the present embodiment, the main magnetic sensor 50 functions as a main sensor, and the sub magnetic sensor 60 functions as a sub sensor. In the present embodiment, the main magnetic sensor 50 outputs the output signal Sd11 with a constant period (for example, a period of 1000 μs). The sub magnetic sensor 60 outputs the output signal Sd12 at the timing of receiving a timing signal St from the main magnetic sensor 50.

In the following description, elements of the main magnetic sensor 50 are denoted by numbers in the 50s and 500s, and elements of the sub magnetic sensor 60 are denoted by numbers in the 60s and 600s. Elements denoted by numbers having the same last digit of 50s and 60s or the same last two digits of 500s and 600s have the same configuration. Hereinbelow, the main magnetic sensor 50 will be mainly described, and description of the sub magnetic sensor 60 will be omitted as appropriate.

Figure 3:
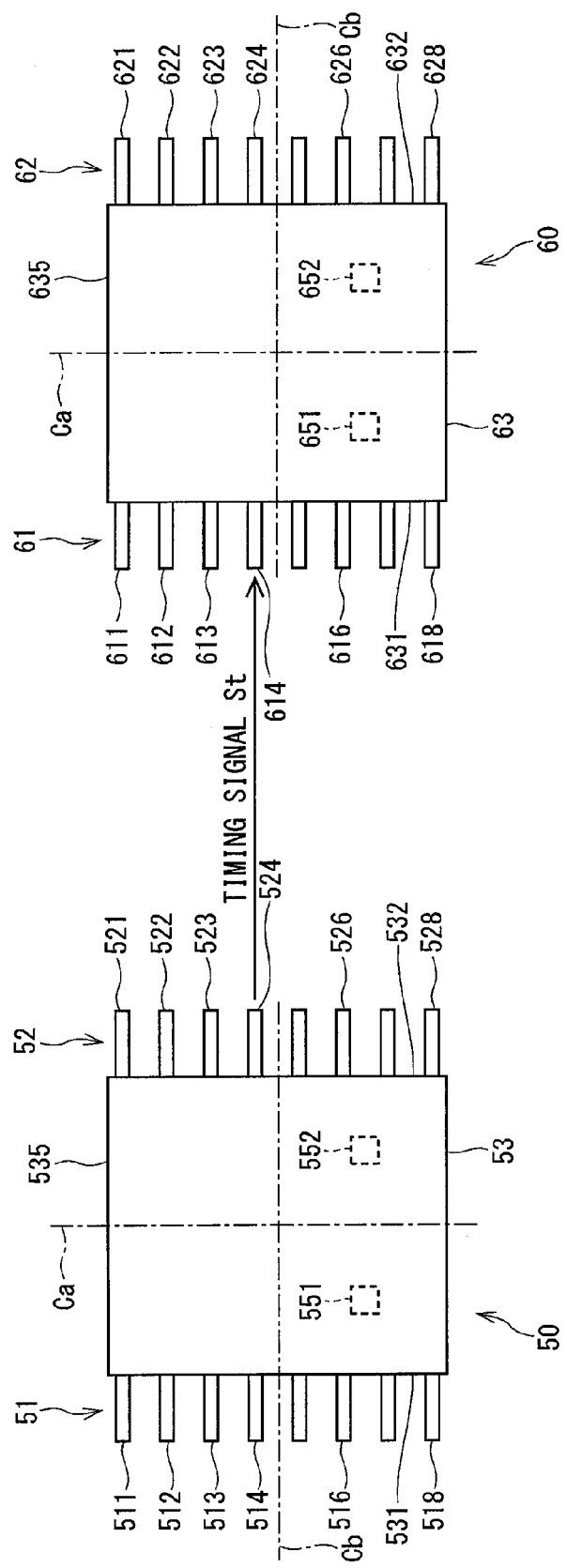
FIG. 3 is a plan view illustrating magnetic sensors according to the first embodiment of the present disclosure.

As illustrated in FIGS. 3 and 4, the main magnetic sensor 50 includes a first terminal group 51, a second terminal group 52, a sealing section 53, and a main sensor section 55. The sub magnetic sensor 60 includes a first terminal group 61, a second terminal group 62, a sealing section 63, and a sub sensor section 65. In the present embodiment, the sensor sections 55, 65 correspond to "sensor sections".

As illustrated in FIG. 3, the first terminal group 51 and the second terminal group 52 project from the sealing section 53. The first terminal group 51 projects from a first side face 531 of the sealing section 53, and the second terminal group 52 projects from a second side face 532 of the sealing section 53, the second side face 532 being located opposite to the first side face 531. The first terminal group 51 and the second terminal group 52 are line-symmetric to each other with respect to a center line Ca. In the present embodiment, the first terminal group 51 of the main magnetic sensor 50 and the second terminal group 62 of the sub magnetic sensor 60 are disposed on the outer side, and the second terminal group 52 of the main magnetic sensor 50 and the first terminal group 61 of the sub magnetic sensor 60 are disposed on the inner side.

The first terminal group 51 includes eight terminals, specifically, first to eight terminals 511 to 518 arranged in this order from a first end 535. Similarly, the second terminal group 52 includes eight terminals, specifically, first to eight terminals 521 to 528 arranged in this order from the first end 535. In FIG. 3, reference signs of terminals whose function will not be described in the present embodiment will be omitted as appropriate.

In the present embodiment, in the first terminal group 51, the first terminal 511 may be a power terminal, the second terminal 512 may be a communication terminal, and the third terminal 513 may be a ground terminal. In the second terminal group 52, the first terminal 521 may be a power terminal, the second terminal 522 may be a communication terminal, and the third terminal 523 may be a ground terminal.

Similarly, also in the sub magnetic sensor 60, in the first terminal group 61, the first terminal 611 may be a power terminal, the second terminal 512 may be a communication terminal, and the third terminal 513 may be a ground terminal. In the second terminal group 62, the first terminal 621 may be a power terminal, the second terminal 622 may be a communication terminal, and the third terminal 623 may be a ground terminal.

In the present embodiment, the power terminals, the communication terminals, and the ground terminals in the first terminal group 51 of the main magnetic sensor 50 and the second terminal group 62 of the sub magnetic sensor 60 which are disposed on the outer side are connected to the ECU 85. Specifically, the first terminal 511 as the power terminal of the main magnetic sensor 50 and the ECU 85 are connected through a power line 111, the second terminal 512 as the communication terminal and the ECU 85 are connected through a communication line 112, and the third terminal 513 as the ground terminal and the ECU 85 are connected through a ground line 113. The first terminal 621 as the power terminal of the sub magnetic sensor 60 and the ECU 85 are connected through a power line 121, the second terminal 622 as the communication terminal and the ECU 85 are connected through a communication line 122, and the third terminal 623 as the ground terminal and the ECU 85 are connected through a ground line 123 (refer to FIG. 4).

Power regulated at a predetermined voltage (5 V, for example) is supplied to the power terminals from a regulator (not illustrated) of the ECU 85. The ground terminals are connected to the ground through the ECU 85.

The power terminals, the communication terminals, and the ground terminals in the second terminal group 52 of the main magnetic sensor 50 and the first terminal group 61 of the sub magnetic sensor 60 which are disposed on the inner side are not connected to the ECU 85 and not allowed to function.

In the present embodiment, the timing signal St (described below) is transmitted and received between the main magnetic sensor 50 and the sub magnetic sensor 60. In the first terminal group 51 of the main magnetic sensor 50, the nth terminal from the first end 535 is defined as a reception terminal, and the mth terminal from the first end 535 is defined as a transmission terminal. In the second terminal group 52 of the main magnetic sensor 50, the nth terminal from the first end 535 is defined as a transmission terminal, and the mth terminal from the first end 535 is defined as a reception terminal.

Similarly, in the first terminal group 61 of the sub magnetic sensor 60, the nth terminal from the first end 635 is defined as a reception terminal, and the mth terminal from the first end 635 is defined as a transmission terminal. In the second terminal group 62 of the sub magnetic sensor 60, the nth terminal from the first end 635 is defined as a transmission terminal, and the mth terminal from the first end 635 is defined as a reception terminal. When the number of terminals in each of the first terminal groups 51, 61 and each of the second terminal groups 52, 62 is k (eight, in the present embodiment), both n and m are integers 1 or more and k or less, and n≠m.

Specifically, in the first terminal group 51, the fourth terminal from the first end 535, or the fourth terminal 514 may be the reception terminal and the sixth terminal from the first end 535, or the sixth terminal 516 may be the transmission terminal. In the first terminal group 61, the fourth terminal from the first end 635, or the fourth terminal 614 may be the reception terminal and the sixth terminal from the first end 635, or the sixth terminal 616 may be the transmission terminal. Further, in the second terminal group 52, the fourth terminal from the first end 535, or the fourth terminal 524 may be the transmission terminal and the sixth terminal from the first end 535, or the sixth terminal 526 may be the reception terminal. In the second terminal group 62, the fourth terminal from the first end 635, or the fourth terminal 624 may be the transmission terminal and the sixth terminal from the first end 635, or the sixth terminal 626 may be the reception terminal. In the present embodiment, the transmission terminal (the fourth terminal 524) in the second terminal group 52 of the main magnetic sensor 50 and the reception terminal (the fourth terminal 614) in the first terminal group 61 of the sub magnetic sensor 60 which are disposed on the inner side are connected through a signal line 115 (refer to FIG. 4). The timing signal St is transmitted from the fourth terminal 524 as the transmission terminal of the main magnetic sensor 50 to the fourth terminal 614 as the reception terminal of the sub magnetic sensor 60.

In the present embodiment, in view of a reduction in the number of types of components, the main magnetic sensor 50 and the sub magnetic sensor 60 have the same configuration. In the magnetic sensors 50, 60, in order to position sensor elements 551, 552, 651, 652 (described below) between the magnetism collection sections 215, 225, the sensor elements 551, 552, 651, 652 are disposed at positions deviated from a center line Cb. Thus, when the magnetic sensors 50, 60 have the same configuration, the magnetic sensors 50, 60 cannot be disposed in the opposite directions, and are required to be mounted on the substrate 41 side by side in the same direction.

Thus, in the present embodiment, terminals that may function as a power terminal, a communication terminal, a ground terminal, a reception terminal, and a transmission terminal are provided in each of the first terminal groups 51, 61 and each of the second terminal groups 52, 62 in the main magnetic sensor 50 and the sub magnetic sensor 60. Since the power terminals, the communication terminals, the ground terminals in the first terminal group 51 of the main magnetic sensor 50 and the second terminal group 62 of the sub magnetic sensor 60 which are disposed on the outer side are connected to the ECU 85, a wiring pattern on the substrate 41 is easily formed.

The timing signal St is transmitted from the transmission terminal in the second terminal group 52 of the main magnetic sensor 50 to the reception terminal in the first terminal group 61 of the sub magnetic sensor 60, the transmission terminal and the reception terminal being disposed on the inner side. In particular, both the transmission terminal in the second terminal group 52 of the main magnetic sensor 50 and the reception terminal in the first terminal group 61 of the sub magnetic sensor 60 are the fourth terminals from the first ends 535, 635 and adjacent to each other when the magnetic sensors 50, 60 are arranged side by side. Thus, the wiring pattern on the substrate 41 is easily formed.

The sealing section 53 seals the main sensor section 55 which includes a chip and has a substantially rectangular shape in plan view.

As illustrated in FIG. 4, the main sensor section 55 includes the sensor elements 551, 552, A/D conversion circuits 553, 554, an output circuit 555, and a timing signal generation circuit 556.

The sensor elements 551, 552 are magnetism detection elements which detect a magnetic flux between the magnetism collection sections 215, 225. The sensor elements 551, 552 of the present embodiment are Hall ICs.

The A/D conversion circuit 553 A/D converts a detection signal of the sensor element 551. The A/D conversion circuit 554 A/D converts a detection signal of the sensor element 552.

The output circuit 555 generates an output signal Sd11 on the basis of detection signals that are detected by the sensor elements 551, 552 and A/D converted. The generated output signal Sd11 is transmitted to the ECU 85 through the second terminal 512 as the communication terminal. In the present embodiment, the output signal Sd11 is transmitted by single edge nibble transmission (SENT) communication which is a kind of digital communication.

The output signal Sd11 will be described in detail with reference to FIG. 5. The number of bits in FIG. 5 is an example, and appropriately set in accordance with, for example, communication standards.

Figure 5:
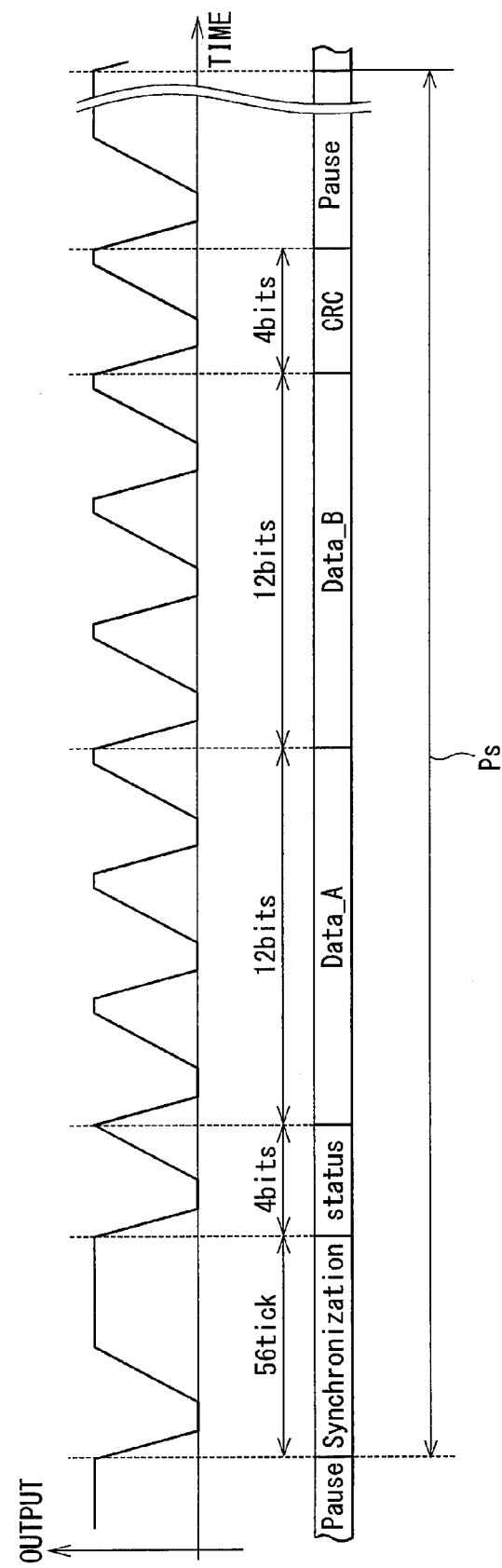
FIG. 5 is a time chart describing an output signal according to the first embodiment of the present disclosure.

As illustrated in FIG. 5, the output signal Sd11 includes a synchronization signal, a status signal, an A signal, a B signal, a CRC signal, and a pause signal which are output in this order as a series of signals. In FIG. 5, the synchronization signal is denoted by "Synchronization", the status signal is denoted by "status", the A signal is denoted by "Data_A", the B signal is denoted by "Data_B", the CRC signal is denoted by "CRC", and the pause signal is denoted by "Pause".

The synchronization signal is a signal for synchronizing clocks of the magnetic sensor 50 and the ECU 85 and 56 tick in the present embodiment.

The A signal is a data signal based on a detection result of the sensor element 551. The B signal is a data signal based on a detection result of the sensor element 552. In the present embodiment, the A signal and the B signal are generated on the basis of detection results of the sensor elements 551, 552 during signal generation. Both the A signal and the B signal have 3 nibbles (=12 bits) and 6 nibbles in total as a data part. The contents of data are only required to have 1 nibble or more and determined in accordance with communication standards.

Figure 6:
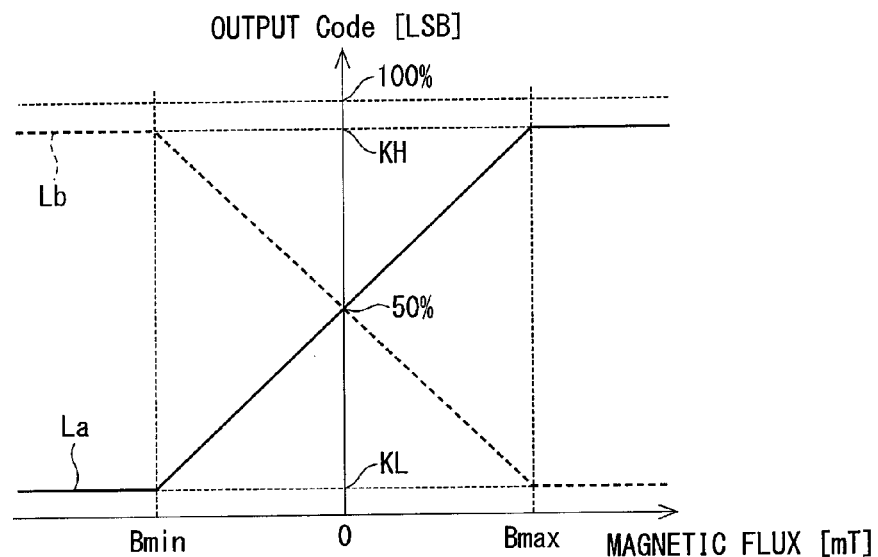
FIG. 6 is an explanatory diagram describing an A signal and a B signal according to the first embodiment of the present disclosure.

As illustrated in FIG. 6, both the A signal and the B signal are signals that correspond to a magnetic flux between the magnetism collection sections 215, 225 and mutually inverted with respect to 50% of an output code. Specifically, as indicated by a solid line La, the A signal has a lower limit value KL when the magnetic flux density is Bmin or less and has an upper limit value KH when the magnetic flux density is Bmax or more, and increases between Bmin and Bmax as the magnetic flux density increases. On the other hand, as indicated by a broken line Lb, the B signal has the upper limit value KH when the magnetic flux density is Bmin or less and the lower limit value KL when the magnetic flux density is Bmax or more, and decreases between Bmin and Bmax as the magnetic flux density increases. Further, KL=0% and KH=100% may be satisfied.

In FIG. 5, for simplifying the description, the pulse of the A signal and the pulse of the B signal are illustrated in the same manner. However, in practice, as described above with reference to FIG. 6, the A signal and the B signal have pulses corresponding to values mutually inverted with respect to 50% of the output code in accordance with a detected magnetic flux density.

Referring back to FIG. 5, the CRC signal is a cyclic redundancy check signal for detecting a communication abnormality and is calculated on the basis of the A signal and the B signal.

The pause signal is a signal that is output during a period until the next synchronization signal is output.

In the present embodiment, a period between the start of a synchronization signal and the start of the next synchronization signal is defined as one frame, and a time required for transmitting signals of one frame is defined as a frame period Ps (1000 µs, for example). The main magnetic sensor 50 outputs the output signal Sd11 to the ECU 85 every frame period Ps. In the present embodiment, the frame period Ps is "the length of one period of the output signal" and "a transmission period".

The same applies to the output signal Sd12 output from the output circuit 655 of the sub sensor section 65. In the output signal Sd12, an A signal is a data signal based on the a detection result of the sensor element 651, and a B signal is a data signal based on a detection result of the sensor element 652.

Referring back to FIG. 4, the timing signal generation circuit 556 generates a timing signal St corresponding to an output timing of the output signal Sd12 output from the sub magnetic sensor 60 on the basis of clocking by a timer 557. The generated timing signal St is transmitted to the sub magnetic sensor 60 through the fourth terminal 524 as the transmission terminal and the fourth terminal 614 as the reception terminal.

Since the sub sensor section 65 has the same configuration as the main sensor section 55, the sub sensor section 65 includes a timing signal generation circuit 656 and a timer 657 which has the same configuration as the timing signal generation circuit 556. However, since the sub magnetic sensor 60 is set as the sub sensor in the EEPROM, the timing signal generation circuit 656 is not allowed to function.

Transmission timings of the output signals Sd11, Sd12 to the ECU 85 from the sensor sections 55, 65 will be described. In the present embodiment, the output signals Sd11, Sd12 are transmitted not at the timing of receiving a trigger signal from the ECU 85, but transmitted from the sensor sections 55, 65 to the ECU 85 without using a trigger signal. A transmission method that transmits the output signals Sd11, Sd12 in response to a trigger signal from the ECU 85 is referred to as "synchronous communication". A transmission method that transmits the output signals Sd11, Sd12 without using a trigger signal from the ECU 85 is referred to as "asynchronous communication". The asynchronous communication eliminates the necessity of transmitting a trigger signal from the ECU 85 to the sensor sections 55, 65. Thus, the number of components related to the generation of a trigger signal in the ECU 85 can be reduced. Further, a communication period can be shortened by the elimination of a trigger signal.

Figure 7A:
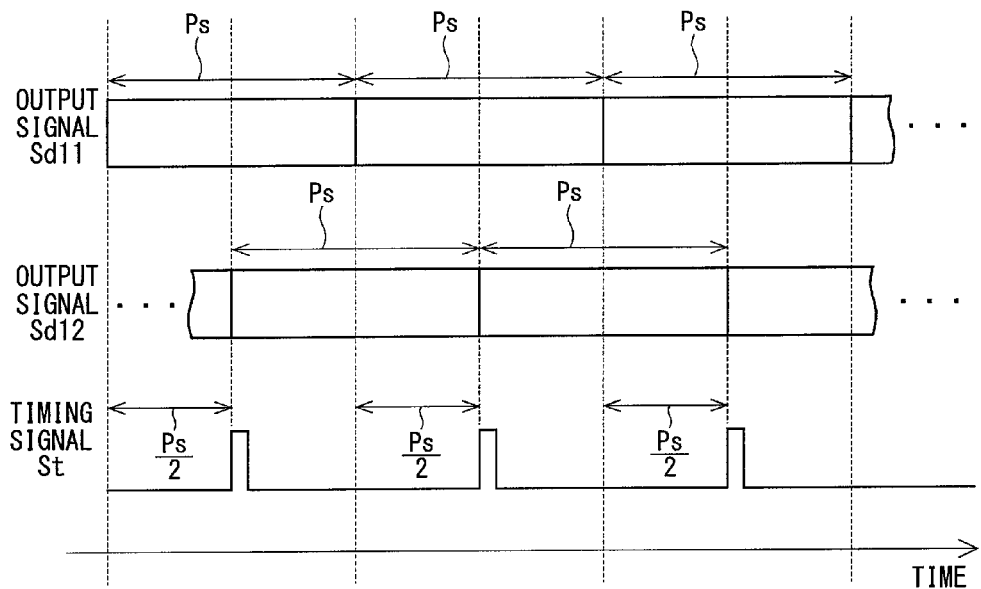
FIGS. 7A and 7B are time charts describing a communication period according to the first embodiment of the present disclosure.
Figure 7B:
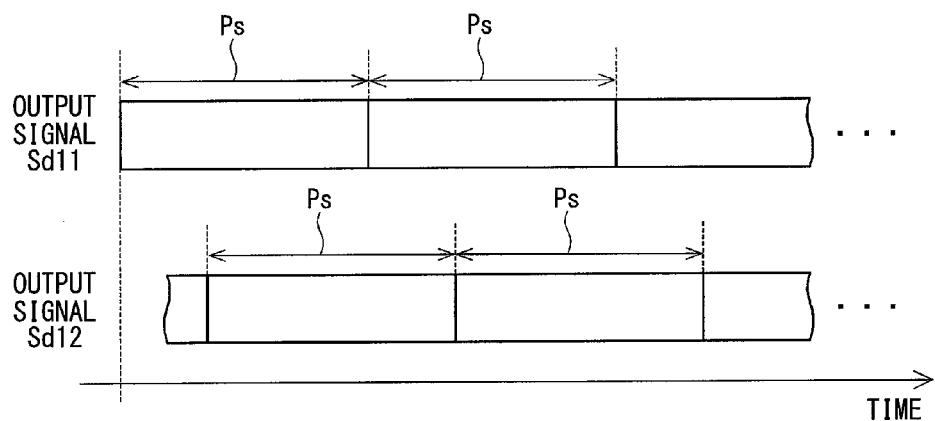

When the sensor sections 55, 65 independently transmit the output signals Sd11, Sd12 to the ECU 85 by asynchronous communication, the output signals Sd11, Sd12 may be output at irregular timings due to an oscillating frequency, individual variations, variations in on-timing of power (refer to FIG. 7B).

Thus, in the present embodiment, as illustrated in FIG. 7A, the main sensor section 55 transmits the timing signal St to the sub sensor section 65 to control the timing of the output of the output signal Sd11 from the main sensor section 55 and the timing of the output of the output signal Sd12 from the sub sensor section 65. The timing signal St is transmitted from the main sensor section 55 to the sub sensor section 65 at any timing within one frame of the output signal Sd11. In the present embodiment, the timing signal St is transmitted at the timing of a half period of one frame. Specifically, for example, when the length of one frame of the output signal Sd11 is Ps, the timing signal St is transmitted at the timing of (Ps/2) from the start of the synchronous signal. Accordingly, the output circuit 655 transmits the output signal Sd12 to the ECU 85 at a timing shifted by the half period from the output signal Sd11.

When the transmissions of the output signals Sd11, Sd12 are shifted from each other by the half period, the ECU 85 receives the output signals Sd11, Sd12 every half period. That is, the ECU 85 receives the output signals Sd11, Sd12 with a period of (Ps/2), that is, acquires information about the steering torque with a period of (Ps/2).

In other words, the ECU 85 alternately acquires the output signals Sd11, Sd12 at regular intervals.

Accordingly, an update period of the output signals Sd11, Sd12 becomes short compared with, for example, that in the case when the two sensor sections 55, 65 simultaneously transmit the output signals Sd11, Sd12. Thus, an apparent communication speed can be increased, which enables substantially high-speed communication. Further, an update frequency of the output signals Sd11, Sd12 in the ECU 85 becomes high compared with that in the case when the output signals Sd11, Sd12 are simultaneously acquired, which improves responsiveness, for example, in a sudden change of the steering toque.

In the present embodiment, as illustrated in FIG. 6, the A signal based on a detection result of the sensor element 551 of the main sensor section 55 and the B signal based on a detection result of the sensor element 552 are mutually inverted. Thus, when both the A signal and the B signal are normal, the sum of the A signal and the B signal is a predetermined value KX which corresponds to twice an intermediate value between the upper limit value KH and the lower limit value KL.

The ECU 85 can determine that the main magnetic sensor 50 is normal when the sum of the A signal and the B signal falls within a normal range including the predetermined value KX and determine that the main magnetic sensor 50 is abnormal when the sum of the A signal and the B signal falls out of the normal range, based on the acquired output signal Sd11. That is, in the present embodiment, since the output signal Sd11 from the main magnetic sensor 50 includes two data signals corresponding to detection signals of the two sensor elements 551, 552, the ECU 85 can detect an abnormality in the main magnetic sensor 50. The ECU 85 can also determine abnormalities such as a sky fault and a ground fault on the basis of the output signal Sd11.

Similarly, the ECU 85 can determine an abnormality in the sub magnetic sensor 60 on the basis of the output signal Sd12.

A similar abnormality determination may be performed in each of the magnetic sensors 50, 60 instead of the ECU 85, and information for notifying the occurrence of an abnormality (an abnormality flag, for example) may be transmitted to the ECU 85 or the other magnetic sensor 50 or 60.

The torque sensor 10 of the present embodiment has a redundant configuration that includes the two magnetic sensors 50, 60. Thus, even when either the magnetic sensor 50 or the magnetic sensor 60 becomes abnormal, the steering torque can be detected.

Figure 8:
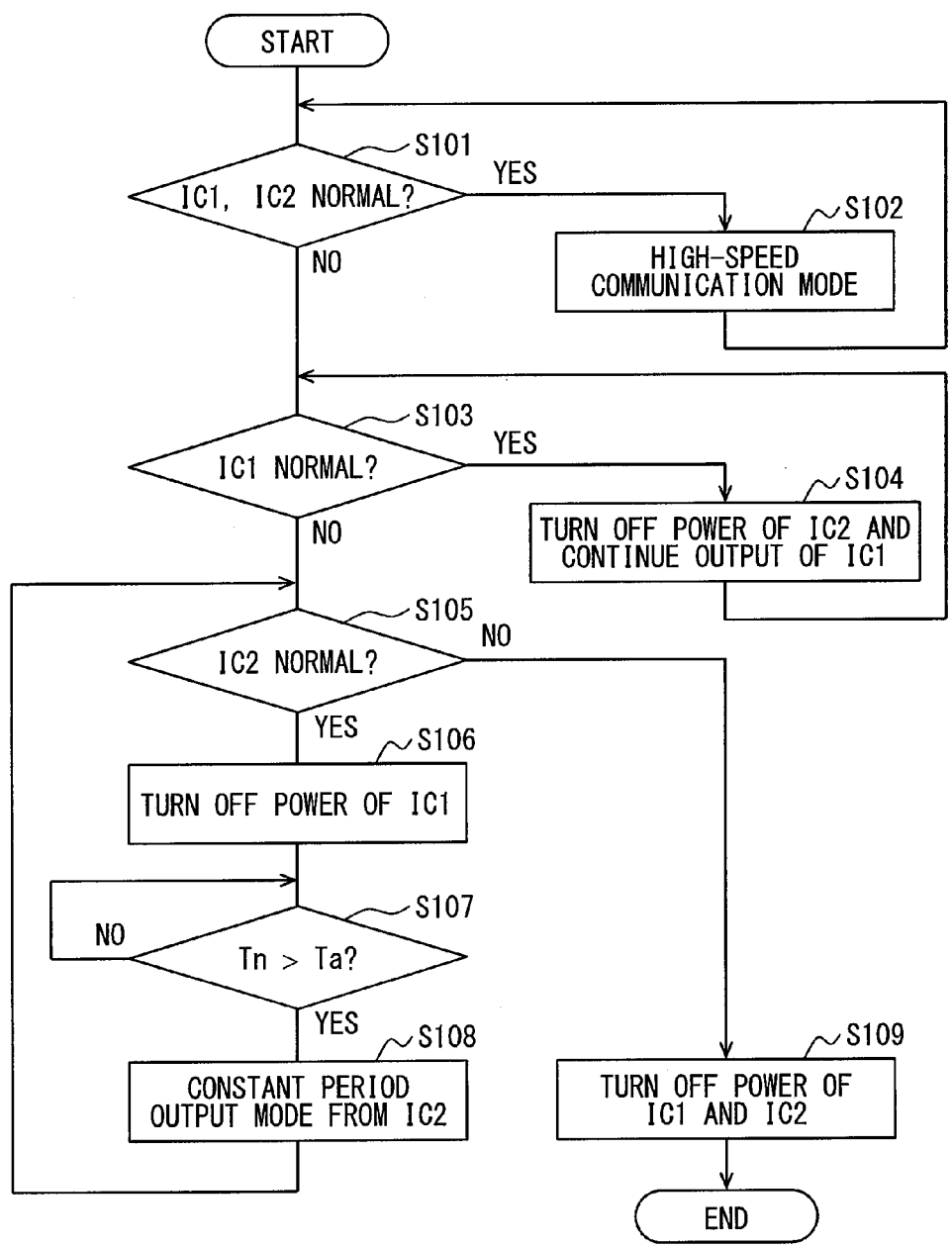
FIG. 8 is a flow chart describing communication processing according to the first embodiment of the present disclosure.

Communication processing by the present embodiment will be described with reference to a flow chart illustrated in FIG. 8. The communication processing is executed when the magnetic sensors 50, 60 and the ECU 85 are in an on state. In FIG. 8, the main sensor section 55 is denoted by "IC1", and the sub sensor section 65 is denoted by "IC2".

In the first step S101 (hereinbelow, "step" is omitted and merely denoted by "S"), whether both the sensor sections 55, 65 are normal is determined. In the present embodiment, the abnormality in the sensor sections 55, 65 includes an abnormality in wiring related to the sensor sections 55, 65. When at least either the sensor section 55 or the sensor section 65 is determined to be abnormal (S101: NO), a shift to S103 is made. When both the sensor sections 55, 65 are determined to be normal (S101: YES), a shift to S102 is made.

In S102, a high-speed communication mode is performed, and a return to S101 is made. Specifically, the main sensor section 55 outputs the output signal Sd11 to the ECU 85 with a constant period. The main sensor section 55 transmits the timing signal St to the sub sensor section 65 so that the output signal Sd12 is output at the timing of a half period after the output timing of the output signal Sd11. The sub sensor section 65 outputs the output signal Sd12 to the ECU 85 at the timing of receiving the timing signal St.

In S103 performed when at least either the sensor section 55 or the sensor section 65 is determined to be abnormal (S101: NO), whether the main sensor section 55 is normal is determined. When the main sensor section 55 is determined to be abnormal (S103: NO), a shift to S105 is made. When the main sensor section 55 is determined to be normal (S103: YES), a shift to S104 is made.

In S104, since the sub sensor section 65 is abnormal, the power of the sub magnetic sensor 60 is turned off. When the power of the sub magnetic sensor 60 has already been turned off, the off state is continued. Further, the main sensor section 55 continues the output of the output signal Sd11 with the constant period. In this case, the transmission of the timing signal St may be continued or stopped. Then, a return to S103 is made.

In S105 performed when the main sensor section 55 is determined to be abnormal (S103: NO), whether the sub sensor section 65 is abnormal is determined. When the sub sensor section 65 is determined to be abnormal (S105: NO), a shift to S109 is made. When the sub sensor section 65 is determined to be normal (S105: YES), a shift to S106 is made.

In S106, since the main sensor section 55 is abnormal, the power of the main magnetic sensor 50 is turned off. When the power of the main magnetic sensor 50 has already been turned off, the off state is continued.

In S107, whether an unreceiving time Tn during which no timing signal St has been received since the reception of the last timing signal St exceeds a determination time Ta is determined. When the unreceiving time Tn is determined to be the determination time Ta or less (S107: NO), that is, when Tn≤Ta is satisfied, the determination processing is repeatedly performed. When the unreceiving time Tn is determined to exceed the determination time Ta (S107: YES), that is, Tn>Ta is satisfied, a shift to S108 is made.

In S108, the sub sensor section 65 is in a backup mode which outputs the output signal Sd12 to the ECU 85 with a constant period without depending on the timing signal St, and a return to S105 is made. When the sub sensor section 65 has already been shifted to the backup mode, the output from the sub sensor section 65 with the constant period is continued.

In S109 performed when both the sensor sections 55, 65 are determined to be abnormal (S103: NO and S105: NO), the power of the magnetic sensor 50 and the power of the magnetic sensor 60 are turned off and the processing is finished. Not only when both the sensor sections 55, 65 are abnormal, but also when the power of the magnetic sensor 50 and the power of the magnetic sensor 60 are turned off, for example, by turning off an ignition power supply (not illustrated), the processing is appropriately finished.

As described above in detail, the communication device 1 of the present embodiment is provided with the plurality of sensor sections 55, 65 and the ECU 85.

The main sensor section 55 includes the sensor elements 551, 552 and the output circuit 555.

The sensor elements 551, 552 detect information about the magnetism collection module 20 (the magnetic flux density between the magnetism collection sections 215, 225 in the present embodiment). The output circuit 555 generates an output signal Sd11 on the basis of detection signals of the sensor elements 551, 552 and transmits the generated output signal Sd11.

The sub sensor section 65 includes the sensor elements 651, 652 and the output circuit 655.

The sensor elements 651, 652 detect information about the magnetism collection module 20 (the magnetic flux density between the magnetism collection sections 215, 225 in the present embodiment). The output circuit 655 generates an output signal Sd12 on the basis of detection signals of the sensor elements 651, 652 and transmits the generated output signal Sd12.

The ECU 85 acquires the output signals Sd11, Sd12.

The sub sensor section 65 transmits the output signal Sd12 to the ECU 85 at a timing that is shifted from a timing of the transmission of the output signal Sd11 from the main sensor section 55 as the other sensor section by a predetermined period that is shorter than the length of one period of the output signals Sd11, Sd12 (the frame period Ps in the present embodiment).

The main sensor section 55 transmits the output signal Sd11 to the ECU 85 at a timing that is shifted from a timing of the transmission of the output signal Sd12 from the sub sensor section 65 as the other sensor section by a predetermined period that is shorter than the length of one period of the output signals Sd11, Sd12 (the frame period Ps in the present embodiment).

In the present embodiment, the plurality of sensor sections 55, 65 are provided, and the timings of outputting the output signals Sd11, Sd12 from the sensor sections are shifted from each other by the predetermined period that is shorter than one period of the output signals Sd11, Sd12. Thus, the update frequency of data in the ECU 85 can be improved, as compared with a case when the output signals Sd11, Sd12 are simultaneously acquired from the sensor sections. Accordingly, the apparent communication speed can be increased.

The sub sensor section 65 determines the output timing of the output signal Sd12 on the basis of the timing signal St output from the main sensor section 55. In the present embodiment, the main sensor section 55 which is one of the sensor sections 55, 65 transmits the timing signal to the sub sensor section 65 which is the sensor section other than the main sensor section 55. The sub sensor section 65 transmits the output signal Sd12 to the ECU 85 in response to the timing signal.

Specially, the main sensor section 55 includes the timing signal generation circuit 556 which is capable of transmitting the timing signal St which indicates the timing of transmitting the output signal Sd12 from the sub sensor section 65 as the other sensor section to the ECU 85. In the present embodiment, the sub sensor section 65 outputs the output signal Sd12 at the timing of receiving the timing signal.

Accordingly, it is possible to appropriately control the timing of the transmission of the output signal Sd11 from the main sensor section 55 and the timing of the transmission of the output signal Sd12 from the sub sensor section 65. In the present embodiment, a trigger signal that requests data transmission is not transmitted from the ECU 85 to the sensor sections 55, 65. Accordingly, a configuration related to the generation of the trigger signal in the ECU 85 can be eliminated.

In the present embodiment, both the sensor sections 55, 65 include the timing signal generation circuits 556, 656. A commonality of the configurations of the sensor sections 55, 65 enables a reduction in the types of components.

The sealing sections 53, 63 which seal the sensor sections 55, 65 are respectively provided in the sensor sections 55, 65. In the present embodiment, the terminal group that projects from the first side face 531 of the sealing section 53 is referred to as the first terminal group 51, and the terminal group that projects from the second side face 532 of the sealing section 53, the second side face 532 being located opposite to the first side face 531, is referred to as the second terminal group 52. The terminal group that projects from the first side face 631 of the sealing section 63 is referred to as the first terminal group 61, and the terminal group that projects from the second side face 632 of the sealing section 63, the second side face 632 being located opposite to the first side face 631, is referred to as the second terminal group 62.

The first terminal groups 51, 61 and the second terminal groups 52, 62 include the reception terminals capable of receiving the timing signal St and the transmission terminals capable of transmitting the timing signal St. Accordingly, when the sensor sections 55, 65 are common in configuration and arranged side by side in the same direction, wiring related to the transmission and reception of the timing signal St can be simplified by transmitting and receiving the timing signal St using the reception terminal and the transmission terminal of the terminal groups 52, 61 which are disposed on the inner side.

In the first terminal groups 51, 61, the nth (the fourth in the present embodiment) terminals 514, 614 from the first ends 535, 635 of the sealing sections 53, 63 are the reception terminals, and the mth (the sixth in the present embodiment) terminals 516, 616 from the first ends 535, 635 are the transmission terminals. In the second terminal group 52, 62, the nth (the fourth in the present embodiment) terminals 524, 624 from the first ends 535, 635 of the sealing sections 53, 63 are the transmission terminals, and the mth (the sixth in the present embodiment) terminals 526, 626 from the first ends 535, 635 are the reception terminals.

Accordingly, when the sensor sections 55, 65 are arranged side by side in the same direction with the position of the first end 535 of the sealing section 53 substantially aligned with the position of the first end 635 of the sealing section 63, the reception terminal and the transmission terminal are adjacent to each other. Thus, the signal line 115 which is a wiring line related to the transmission and reception of the timing signal St can be simplified.

The main sensor section 55 includes the plurality of sensor elements 551, 552. The output circuit 555 generates the output signal Sd11 using detection signals of the sensor elements 551, 552.

The sub sensor section 65 includes the plurality of sensor elements 651, 652. The output circuit 655 generates the output signal Sd12 using detection signals of the sensor elements 651, 652.

Accordingly, abnormalities in the sensor sections 55, 65 can be detected in the ECU 85 on the basis of the output signals Sd11, Sd12 respectively.

The output signals Sd11, Sd12 respectively output from the sensor sections 55, 65 are transmitted in such a manner that the ECU 85 acquires the output signals Sd11, Sd12 at timings with regular intervals. Specifically, the output signals Sd11, Sd12 are started at timings with regular intervals. Accordingly, the ECU 85 can receive the output signals Sd11, Sd12 with a constant frequency.

When the main sensor section 55 is abnormal as an example of the case when some of the plurality of sensor sections 55, 65 are abnormal, the output circuit 555 of the main sensor section 55 in an abnormal state stops the transmission of the output signal Sd11, and the output circuit 655 of the sub sensor section 65 in a normal state transmits the output signal Sd12 with a predetermined period. When the sub sensor section 65 is abnormal, the output circuit 655 of the sensor section 65 in an abnormal state stops the transmission of the output signal Sd12, and the output circuit 555 of the main sensor section 55 in a normal state transmits the output signal Sd11 with a predetermined period.

Accordingly, even when there is an abnormality in some of the plurality of sensor sections 55, 65, the ECU 85 can continue operation using information detected by the sensor section 55 or 65 in a normal state.

The sensor elements 551, 552, 651, 652 are magnetism detection elements which detect a change in the magnetic flux of a detection target. In the present embodiment, the sensor elements 551, 552, 651, 652 are magnetism detection elements which detect a change in the magnetic flux corresponding to a steering torque.

The detection target of the present embodiment is the magnetism collection module 20 which detects the torsional displacement amount of the torsion bar 13 in the steering system 90.

The sensor sections 55, 65 are used in the torque sensor 10 which detects the steering toque on the basis of the torsional displacement amount of the torsion bar 13. The ECU 85 calculates a steering torque on the basis of the output signals Sd11, Sd12 and controls the drive of the motor 81 of the electric power steering device 80 on the basis of the calculated steering toque.

Accordingly, the steering torque can be appropriately detected. Further, controlling the drive of the motor 81 in accordance with the steering toque enables output of an appropriate assist torque.

Second Embodiment

Figure 9:
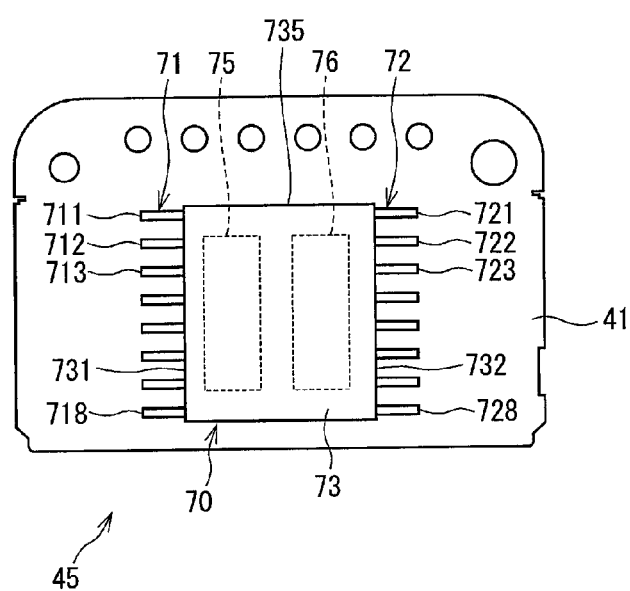
FIG. 9 is a plan view illustrating a sensor unit according to a second embodiment of the present disclosure.
Figure 10:
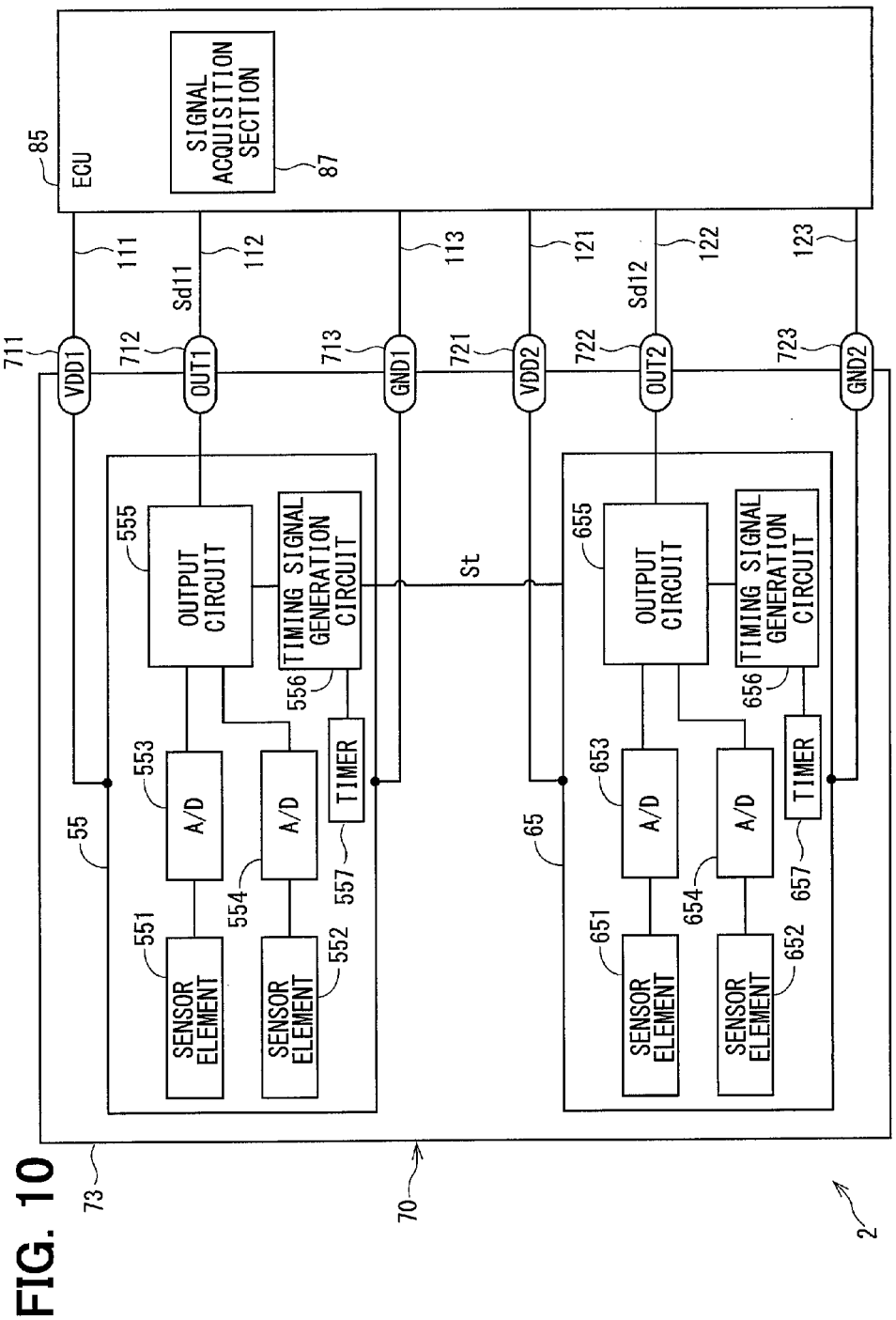
FIG. 10 is a block diagram illustrating a communication device according to the second embodiment of the present disclosure.

FIGS. 9 and 10 illustrate a second embodiment of the present disclosure.

A communication device 2 of the present embodiment is provided with a magnetic sensor 70 and an ECU 85.

A sensor unit 45 includes the magnetic sensor 70 mounted on a substrate 41.

The magnetic sensor 70 includes a first terminal group 71, a second terminal group 72, a sealing section 73, a main sensor section 55 and a sub sensor section 65.

The first terminal group 71 which projects from a first side face 731 of the sealing section 73 includes eight terminals, specifically, first to eight terminals 711 to 718 arranged in this order from a first end 735. The second terminal group 72 which projects from a second side face 732 of the sealing section 73, the second side face 732 being located opposite to the first side face 731, includes eight terminals, specifically, first to eight terminals 721 to 728 arranged in this order from the first end 735. In FIG. 9, reference signs of terminals whose function will not be described in the present embodiment will be omitted as appropriate.

In the first terminal group 71, the first terminal 711 is a power terminal, the second terminal 712 is a communication terminal, and the third terminal 713 is a ground terminal. All the first terminal 711, the second terminal 712, and the third terminal 713 are used for connection between the main sensor section 55 and the ECU 85.

In the second terminal group 72, the first terminal 621 is a power terminal, the second terminal 722 is a communication terminal, and the third terminal 713 is a ground terminal. All the first terminal 621, the second terminal 722, and the third terminal 713 are used for connection between the sub sensor section 65 and the ECU 85.

The sealing section 73 seals the main sensor section 55 and the sub sensor section 65 each of which includes a chip. The sealing section 73 is formed in a substantially rectangular shape in plan view. In the first embodiment, the sealing sections 53, 63 are respectively provided in the sensor sections 55, 65. On the other hand, in the present embodiment, both the sensor sections 55, 65 are sealed by the single sealing section 73 to constitute one package.

In the present embodiment, an output signal Sd11 generated in the output circuit 555 of the main sensor section 55 is output to the ECU 85 through the second terminal 712 which is the communication terminal of the first terminal group 71. An output signal Sd12 generated in the output circuit 655 of the sub sensor section 65 is output to the ECU 85 through the second terminal 712 which is the communication terminal of the second terminal group 72.

In the present embodiment, the main sensor section 55 and the sub sensor section 65 are configured as one package. Thus, the transmission and reception of a timing signal St is performed inside the sealing section 73. Specifically, a timing signal St generated in the timing signal generation circuit 556 of the main sensor section 55 is transmitted to the sub sensor section 65.

Accordingly, a transmission terminal, a reception terminal, and wiring for connecting the transmission terminal to the reception terminal can be eliminated.

The output signals Sd11, Sd12 generated in the output circuits 555, 655 and communication processing of the output signals Sd11, Sd12 are also the same as those of the first embodiment.

The communication device 2 of the present embodiment includes the sensor sections 55, 65 and the ECU 85. With such a configuration, the same effect as the first embodiment is achieved.

Third Embodiment

FIGS. 11 to 14 illustrate a third embodiment of the present disclosure.

Figure 11:
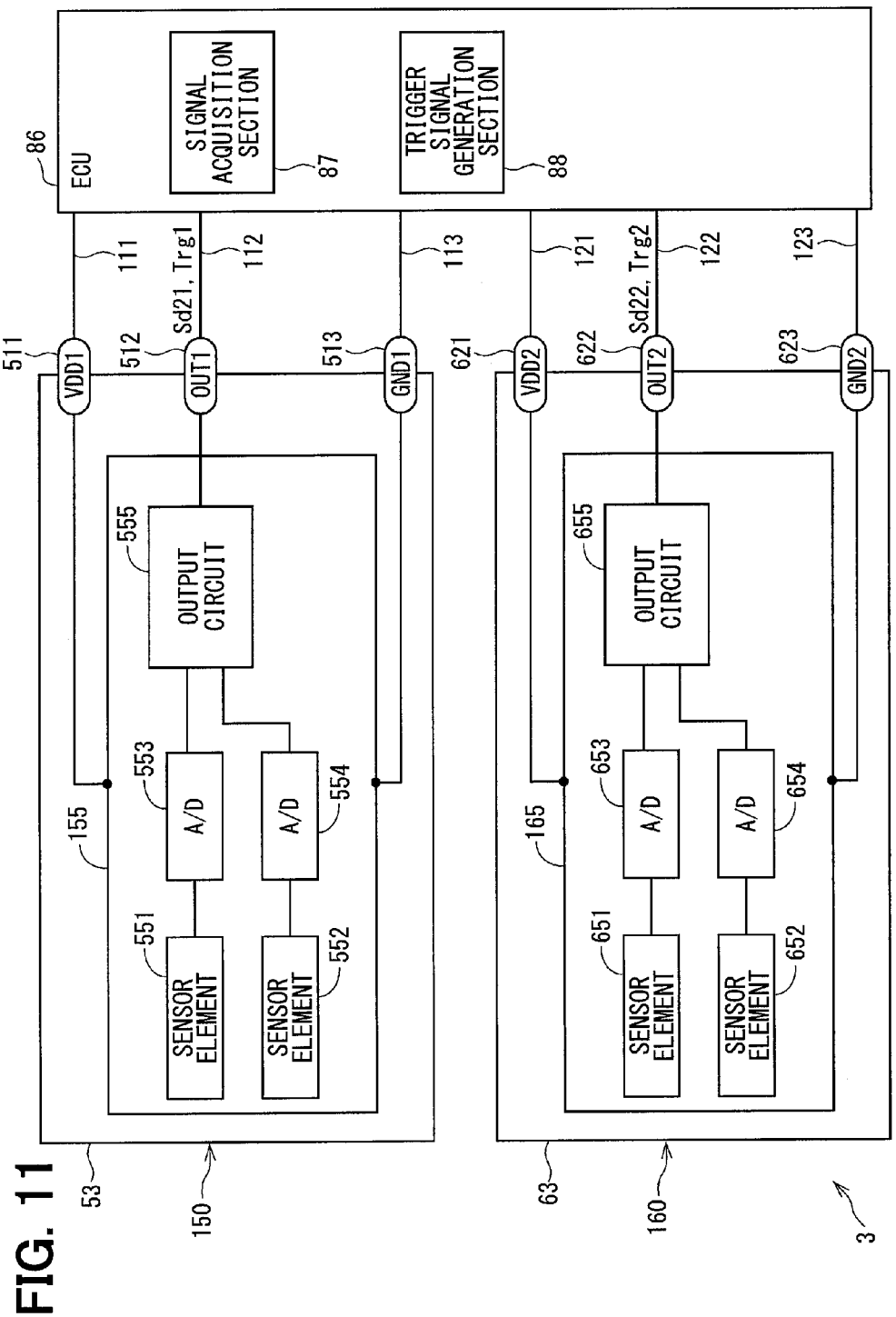
FIG. 11 is a block diagram illustrating a communication device according to a third embodiment of the present disclosure.

As illustrated in FIG. 11, a communication device 3 of the present embodiment is provided with a main magnetic sensor 150, a sub magnetic sensor 160, and an ECU 86 as a control unit (i.e., controller).

The ECU 86 controls the drive of a motor 81 in accordance with a steering toque that is calculated on the basis of output signals Sd21, Sd22 output from the magnetic sensors 150, 160. The ECU 86 includes a signal acquisition section 87 and a trigger signal generation section 88.

The trigger signal generation section 88 generates a trigger signal Trg1 which requests the transmission of the output signal Sd21. The trigger signal Trg1 is transmitted to a main sensor section 155 through a second terminal 512 which is a communication terminal of a first terminal group 51.

The trigger signal generation section 88 generates a trigger signal Trg2 which requests the transmission of the output signal Sd22. The trigger signal Trg2 is transmitted to a sub sensor section 165 through a second terminal 622 which is a communication terminal of a second terminal group 62.

In the other points, the ECU 86 is substantially the same as the ECU 85 of the first embodiment.

The main magnetic sensor 150 includes the main sensor section 155.

The main sensor section 155 includes sensor elements 551, 552, A/D conversion circuits 553, 554, and an output circuit 555. That is, the main sensor section 155 differs from the main sensor section of the first embodiment in that the timing signal generation circuit 556 and the timer 557 are eliminated.

When the trigger signal Trg1 is transmitted, the output circuit 555 generates an output signal Sd21 on the basis of detection signals that are detected by the sensor elements 551, 552 and A/D converted. The generated output signal Sd21 is transmitted to the ECU 86 through the second terminal 512 as the communication terminal.

The sub magnetic sensor 160 includes the sub sensor section 165.

The sub sensor section 165 includes sensor elements 651, 652, A/D conversion circuits 653, 654, and an output circuit 655. That is, the sub sensor section 165 differs from the sub sensor section of the first embodiment in that the timing signal generation circuit 656 and the timer 657 are eliminated.

When the trigger signal Trg2 is transmitted, the output circuit 655 generates an output signal Sd22 on the basis of detection signals that are detected by the sensor elements 651, 652 and A/D converted. The generated output signal Sd22 is transmitted to the ECU 86 through the second terminal 622 as the communication terminal.

In the present embodiment, similarly to the above embodiments, the output signals Sd21, Sd22 are transmitted by SENT communication.

In the present embodiment, the transmission of a timing signal St from the main sensor section 155 to the sub sensor section 165 is not performed. Thus, the configurations of the terminal groups and a sealing section are the same as those of the first embodiment except that terminals that function as a reception terminal and a transmission terminal are not provided.

In the first embodiment, whether to function as a main sensor or a sub sensor is previously set in the EEPROM. On the other hand, in the present embodiment, the same processing is performed without setting main and sub sensors. In the present embodiment, for the convenience of description, the "main sensor section 155" and the "sub sensor section 165" are distinguished from each other, but the function of the main sensor section 155 and the function of the sub sensor section 165 are the same. That is, in the present embodiment, the two sensor sections are referred to as "main" and "sub" sensor sections merely for a distinction therebetween. Thus, there is no master-servant relationship between the two sensor sections. The same applies to fourth to sixth embodiments.

In the present embodiment, the main sensor section 155 is sealed by a sealing section 53 and the sub sensor section 165 is sealed by a sealing section 63 to constitute two packages as with the first embodiment. However, both the sensor sections 155, 165 may be sealed by a single sealing section to constitute one package as with the second embodiment.

Figure 12:
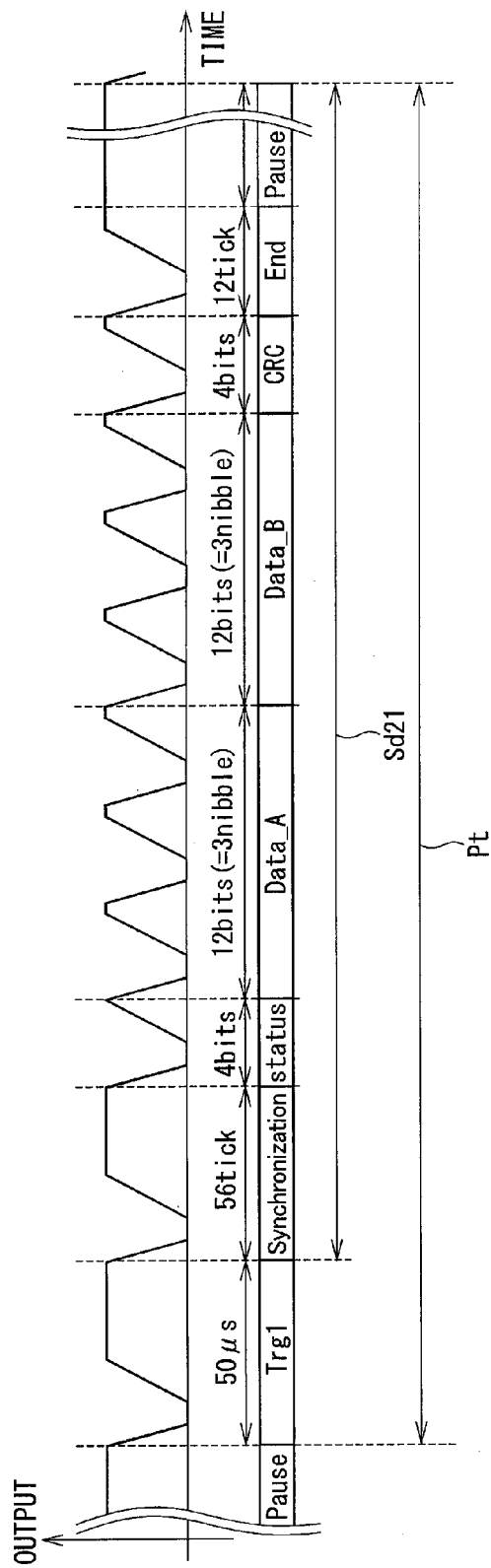
FIG. 12 is a time chart describing a trigger signal and an output signal according to the third embodiment of the present disclosure.

The output signals Sd21, Sd22 will be described in detail with reference to FIG. 12. The number of bits in FIG. 12 is an example, and appropriately set in accordance with, for example, communication standards.

In the present embodiment, the output signal Sd21 includes a synchronization signal, a status signal, an A signal, a B signal, a CRC signal, an end signal, and a pause signal which are output in this order as a series of signals. The synchronization signal, the status signal, the A signal, the B signal, and the CRC signal are the same as those of the above embodiments.

The end signal indicates finish of the output of the A signal and the B signal as data signals. After the output of the end signal, the pause signal is output until the next trigger signal Trg1 is detected.

In the present embodiment, a communication line 112 is commonly used in both the transmission of the trigger signal Trg1 from the ECU 86 to the main sensor section 155 and the transmission of the output signal Sd21 from the main sensor section 155 to the ECU 86. Thus, the signal acquisition section 87 acquires the output signal Sd21 following the trigger signal Trg1. In the present embodiment, a period between the start of a trigger signal Trg1 and the start of the next trigger signal Trg1 is defined as one frame. In the present embodiment, a period required for transmitting signals of one frame is defined as a frame period Pt (1000 μs, for example). The main magnetic sensor 150 outputs the output signal Sd21 to the ECU 86 every frame period Pt. In the present embodiment, the frame period Pt is "the length of one period of the output signal" and "a transmission period".

Similarly, a communication line 122 is commonly used in both the transmission of the trigger signal Trg2 from the ECU 86 to the sub sensor section 165 and the transmission of the output signal Sd22 from the sub sensor section 165 to the ECU 86. Thus, the signal acquisition section 87 acquires the output signal Sd22 following the trigger signal Trg2. Since details of the output signal Sd22 are the same as the details of the output signal Sd21, description thereof will be omitted.

Transmission timings of the output signals Sd21, Sd22 from the sensor sections 155, 165 to the ECU 86 will be described. In the present embodiment, "synchronous communication" in which the sensor sections 155, 165 transmit the output signals Sd21, Sd22 upon receiving trigger signals Trg1, Trg2 transmitted from the ECU 86 is performed. The synchronous communication enables the ECU 86 to acquire the output signals Sd21, Sd22 at desired timings.

Figure 13:
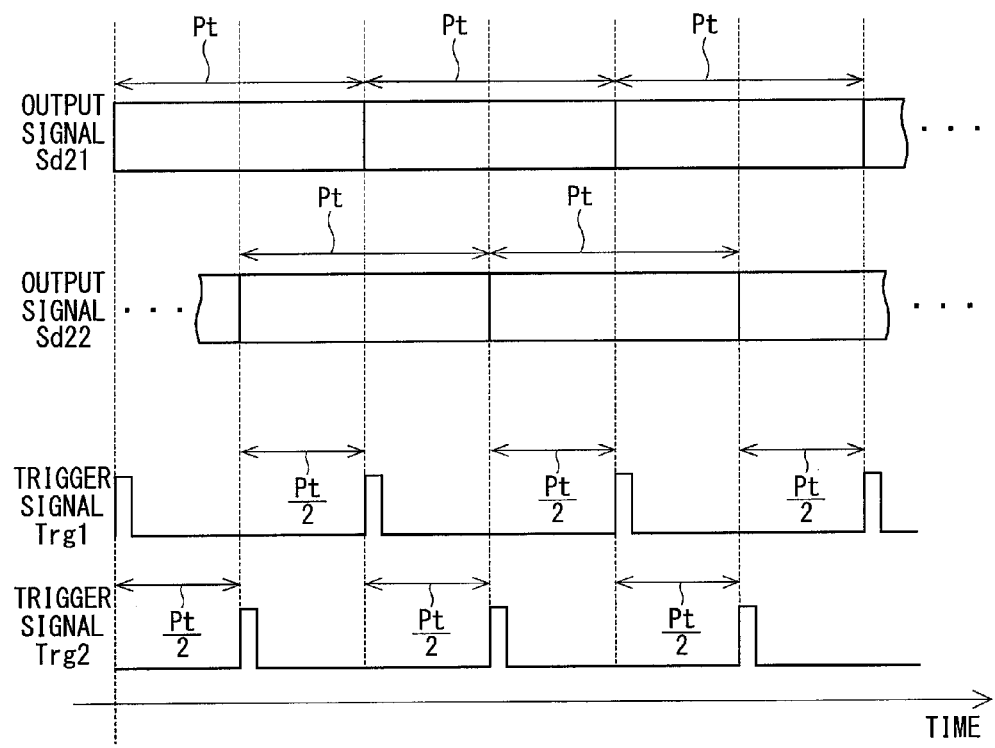
FIG. 13 is a time chart describing a communication period according to the third embodiment of the present disclosure.

As illustrated in FIG. 13, the trigger signals Trg1, Trg2 are transmitted from the ECU 86 to the sensor sections 155, 165 at timings shifted from each other by a half period of the output signals Sd21, Sd22. In other words, the trigger signal Trg2 is transmitted to the sub sensor section 165 at a timing of (Pt/2) after the start of the transmission of the trigger signal Trg1, and the trigger signal Trg1 is transmitted to the main sensor section 155 at a timing of (Pt/2) after the start of the transmission of the trigger signal Trg2.

Accordingly, the output signals Sd21, Sd22 are transmitted to the ECU 86 at timings shifted from each other by the half period of the output signals Sd21, Sd22.

When the transmissions of the output signals Sd21, Sd22 are shifted from each other by the half period, the ECU 86 receives the output signals Sd21, Sd22 every half period similarly to the above embodiments. That is, the ECU 86 receives the output signals Sd21, Sd22 with a period of (Pt/2), that is, acquires information about the steering torque with a period of (Pt/2).

In other words, the ECU 86 alternately acquires the output signals Sd21, Sd22 at regular intervals.

Accordingly, an update period of the output signals Sd21, Sd22 becomes short compared with, for example, that in the case when the two sensor sections 155, 165 simultaneously transmit the output signals Sd21, Sd22. Thus, an apparent communication speed can be increased, which enables substantially high-speed communication. Further, an update frequency of the output signals Sd21, Sd22 in the ECU 86 becomes high compared with that in the case when the output signals Sd21, Sd22 are simultaneously acquired, which improves responsiveness, for example, in a sudden change of the steering toque.

The present embodiment has a redundant configuration that includes the two magnetic sensors 150, 160. Thus, even when either the magnetic sensor 150 or the magnetic sensor 160 becomes abnormal, the steering torque can be detected. The abnormality detection is performed similarly to the above embodiments.

Figure 14:
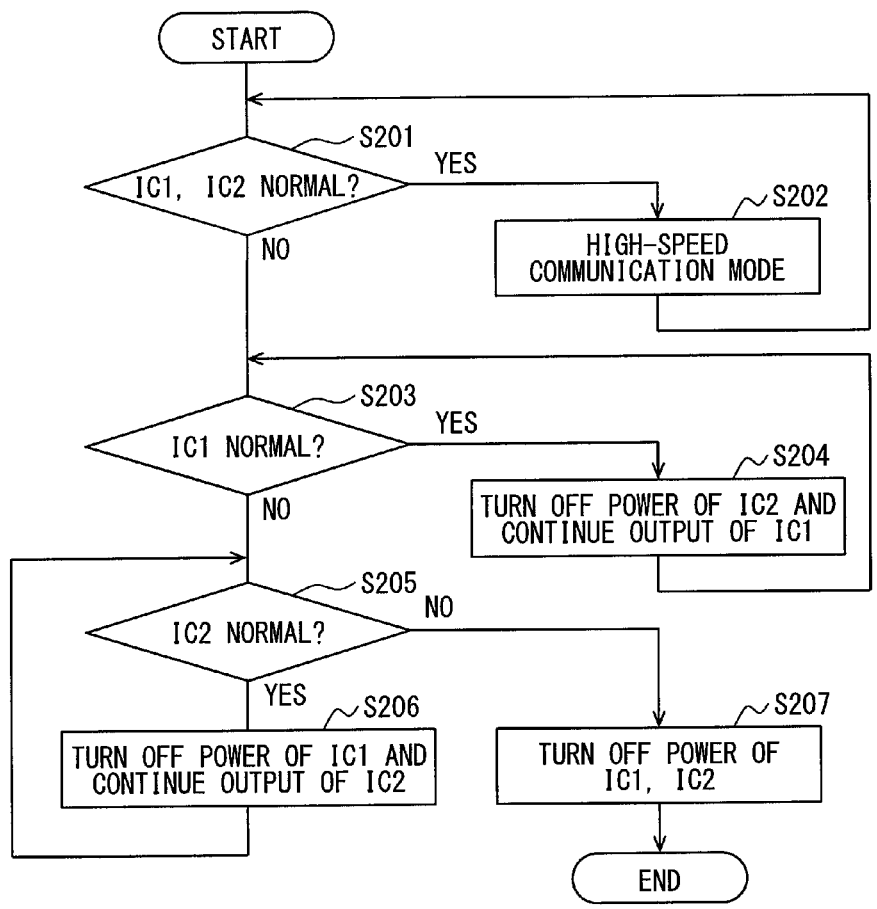
FIG. 14 is a flow chart describing communication processing according to the third embodiment of the present disclosure.

Communication processing by the present embodiment will be described with reference to a flow chart illustrated in FIG. 14. The communication processing is executed when the magnetic sensors 150, 160 and the ECU 86 are in an on state. In FIG. 14, the main sensor section 155 is denoted by "IC1", and the sub sensor section 165 is denoted by "IC2".

In S201, similarly to S101 in FIG. 8, when at least either the sensor section 155 or the sensor section 165 is determined to be abnormal (S201: NO), a shift to S203 is made. On the other hand, when both the sensor sections 155, 165 are determined to be normal (S201: YES), a shift to S202 is made.

In S202, a high-speed communication mode is performed, and a return to S201 is made. Specifically, the ECU 86 outputs the trigger signals Trg1, Trg2 to the sensor sections 155, 165 at timings shifted from each other by the half period. The main sensor section 155 generates an output signal Sd21 and transmits the generated output signal Sd21 to the ECU 86 when the trigger signal Trg1 is detected. The sub sensor section 165 generates an output signal Sd22 and transmits the generated output signal Sd22 to the ECU 86 when the trigger signal Trg2 is detected.

In S203, similarly to S103 in FIG. 8, when the main sensor section 155 is determined to be abnormal (S203: NO), a shift to S205 is made. On the other hand, when the main sensor section 155 is determined to be normal (S03: YES), a shift to S204 is made.

In S204, since the sub sensor section 165 is abnormal, the power of the sub magnetic sensor 160 is turned off. When the power of the sub magnetic sensor 160 has already been turned off, the off state is continued. Further, the ECU 86 continues the output of the trigger signal Trg1. The main sensor section 155 continues the output of the output signal Sd21 in response to the trigger signal Trg1.

In S205, similarly to S105 in FIG. 8, when the sub sensor section 165 is determined to be abnormal (S205: NO), a shift to S207 is made. On the other hand, when the sub sensor section 165 is determined to be normal (S205: YES), a shift to S206 is made.

In S206, since the main sensor section 155 is abnormal, the power of the main magnetic sensor 150 is turned off. When the power of the main magnetic sensor 150 has already been turned off, the off state is continued. Further, the ECU 86 continues the output of the trigger signal Trg2. The sub sensor section 165 continues the output of the output signal Sd22 in response to the trigger signal Trg2.

In S207, similarly to S109 in FIG. 8, the power of the magnetic sensor 150 and the power of the magnetic sensor 160 are turned off and the processing is finished. Similarly to the first embodiment, not only when both the sensor sections 155, 165 are abnormal, but also when the power of the magnetic sensor 150 and the power of the magnetic sensor 160 are turned off, for example, by turning off an ignition power supply (not illustrated), the processing is appropriately finished.

In the present embodiment, the ECU 86 transmits the trigger signals Trg1, Trg2 as timing signals that indicate the timings of transmitting the output signals Sd21, Sd22 to the sensor sections 155, 165.

Accordingly, the ECU 86 can acquire the output signals Sd21, Sd22 at desired timings.

The same effect as the above embodiments is achieved.

In the present embodiment, the main sensor section 155 and the sub sensor section 165 correspond to "sensor sections", and the trigger signals Trg1, Trg2 correspond to "timing signals".

Fourth Embodiment

Figure 15:
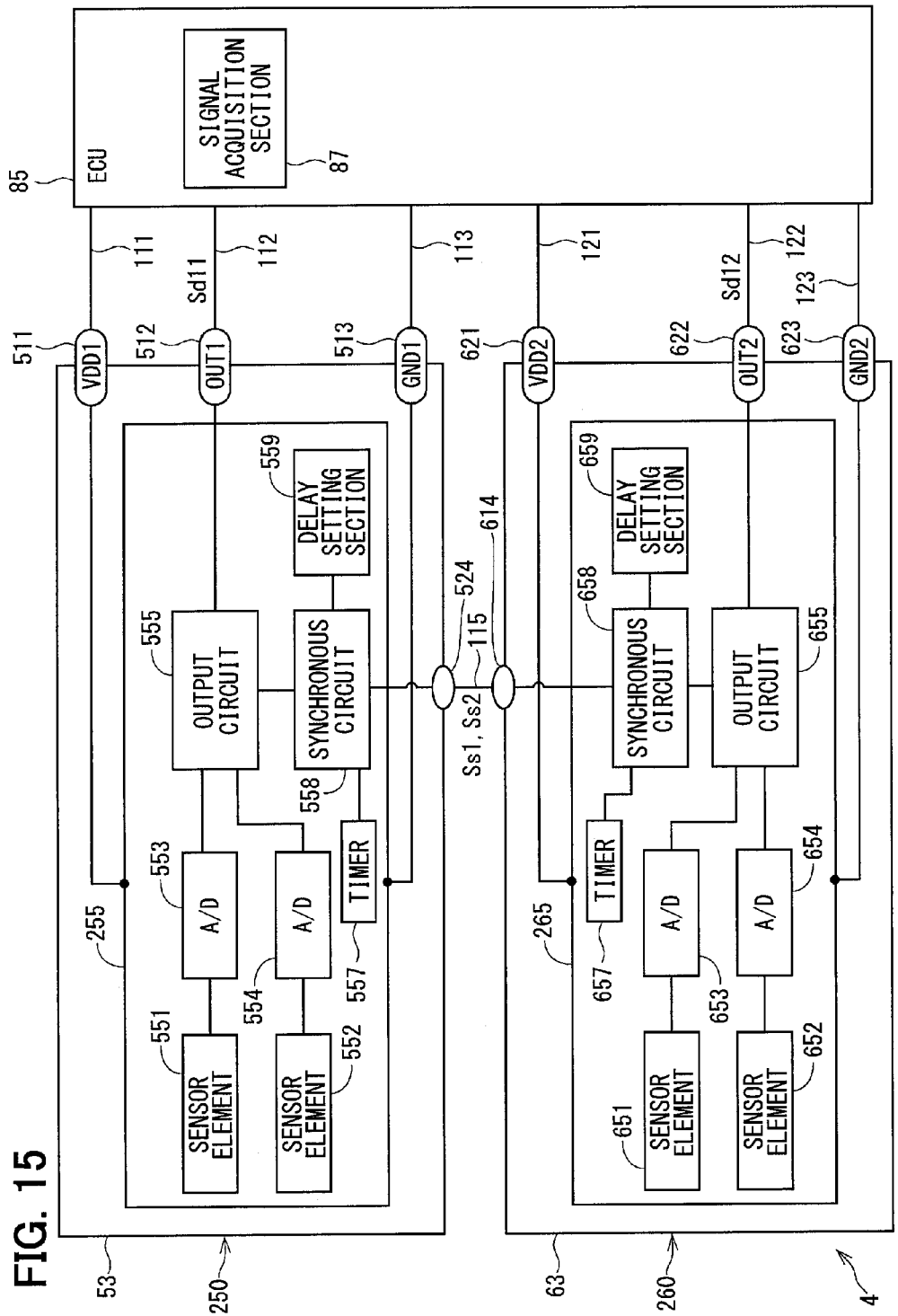
FIG. 15 is a block diagram illustrating a communication device according to a fourth embodiment of the present disclosure.
Figure 16:
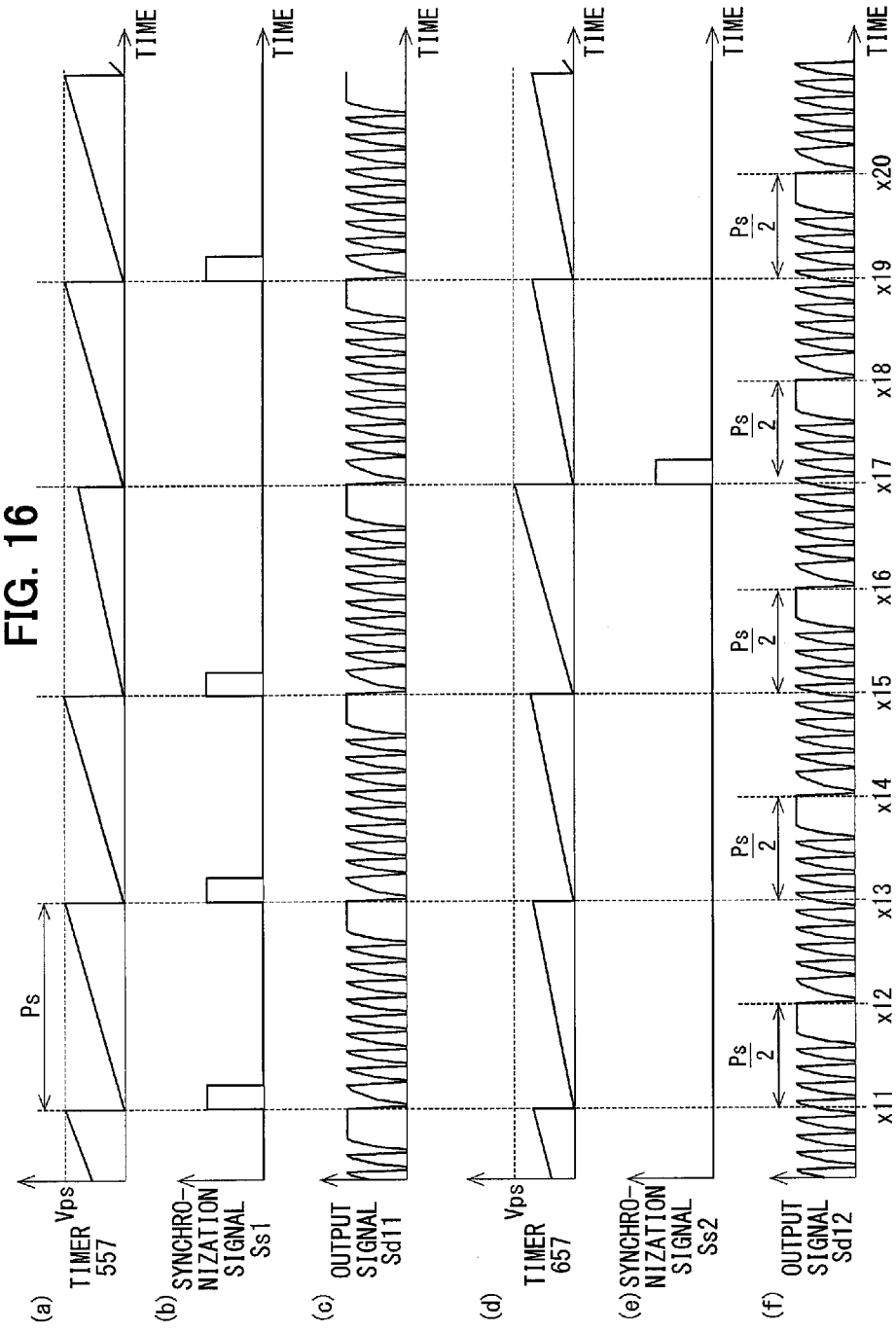
FIG. 16 is a time chart describing communication processing according to the fourth embodiment of the present disclosure.
Figure 17:
FIG. 17 is a time chart describing communication processing according to the fourth embodiment of the present disclosure.

FIGS. 15 to 17 illustrate a fourth embodiment of the present disclosure.

As illustrated in FIG. 15, a communication device 4 of the present embodiment is provided with a main magnetic sensor 250, a sub magnetic sensor 260, and an ECU 85.

A main sensor section 255 of the main magnetic sensor 250 includes sensor elements 551, 552, A/D conversion circuits 553, 554, an output circuit 555, a timer 557, a synchronous circuit 558, and a delay setting section 559.

When clocking of the timer 557 reaches a set value Vps corresponding to a frame period Ps, the synchronous circuit 558 outputs a synchronization signal Ss1 to a sub sensor section 265 and resets the timer 557. When a synchronization signal Ss2 output from the sub sensor section 265 is detected before the clocking of the timer 557 reaches the set value Vps, the synchronous circuit 558 resets the clocking of the timer 557 without outputting the synchronization signal Ss1. The clocking of the timer 557 is continued also after the reset thereof. The same applies to a timer 657.

The delay setting section 559 sets a delay time xd1 between the detection of the synchronization signal Ss1, Ss2 and the output of an output signal Sd11. The delay time Xd1 of the output signal Sd11 is zero.

The sub sensor section 265 of the sub magnetic sensor 260 includes sensor elements 651, 652, A/D conversion circuits 653, 654, an output circuit 655, the timer 657, a synchronous circuit 658, and a delay setting section 659.

When clocking of the timer 657 reaches the set value Vps corresponding to the frame period Ps, the synchronous circuit 658 outputs the synchronization signal Ss2 to the main sensor section 255 and resets the timer 657. When the synchronization signal Ss1 output from the main sensor section 255 is detected before the clocking of the timer 657 reaches the set value Vps, the synchronous circuit 658 resets the timer 657 without outputting the synchronization signal Ss2.

The delay setting section 659 sets a delay time xd2 between the detection of the synchronization signal Ss1, Ss2 and the output of an output signal Sd12. The delay time Xd2 of the output signal Sd12 is half the frame period Ps (or, Ps/2).

When either the synchronization signal Ss1 or the synchronization signal Ss2 is detected, the output circuits 555, 655 transmit the output signals Sd11, Sd12 to the ECU 85 after the elapse of the predetermined delay times xd1, xd2 from the detection timing. In the present embodiment, since the delay time xd1 of the output signal Sd11 is zero, the output circuit 555 transmits the output signal Sd11 to the ECU 85 when the synchronization signal Ss1 is output or the synchronization signal Ss2 is detected. Since the delay time xd2 of the output signal Sd12 is (Ps/2), the output circuit 655 transmits the output signal Sd12 to the ECU 85 after the elapse of (Ps/2) from the output timing of the synchronization signal Ss2 or the detection timing of the synchronization signal Ss1.

In the present embodiment, the output signals Sd11, Sd12 are transmitted by "asynchronous communication" that transmits the output signals Sd11, Sd12 without using a trigger signal from the ECU85 similarly to the first embodiment.

The signal transmission timing in the present embodiment will be described with reference to the time chart of FIG. 16. In FIG. 16, (a) represents the timer 557, (b) represents the synchronization signal Ss1, (c) represents the output signal Sd11, (d) represents the timer 657, (e) represents the synchronization signal Ss2, and (f) represents the output signal Sd12. The output signals Sd11, Sd12 are the same as those of the first embodiment, but illustrated in a simplified manner in FIG. 16. In FIG. 16, there is no rising delay in the synchronization signals Ss1, Ss2. The same applies to FIGS. 17, 18, and 20.

As illustrated in (a) and (d) of FIG. 16, although the timers 557, 657 have the same configuration, there may be, in practice, a shift in the timing to reach the set value Vps between the timers 557, 657 due to, for example, an error.

Thus, in the present embodiment, when the timer 557 reaches the set value Vps, the synchronous circuit 558 outputs the synchronization signal Ss1 to the sub sensor section 265. In the sub sensor section 265, the time 657 is reset when the synchronization signal Ss1 is detected.

When the timer 657 reaches the set value Vps, the synchronous circuit 658 outputs the synchronization signal Ss2 to the main sensor section 255. When the synchronization signal Ss2 is detected in the main sensor section 255, the timer 557 is reset.

Accordingly, a clocking error in the timers 557, 657 can be reset every frame period Ps. In other words, the sensor sections 255, 265 synchronize the clocking between the timers 557, 657 using the synchronization signals Ss1, Ss2. That is, the synchronization signals Ss1, Ss2 are used for synchronizing the clocking between the sensor sections 265, 265.

Specifically, when the timer 557 reaches the set value Vps prior to the timer 657 at time x11, the main sensor section 255 resets the timer 557 and outputs the synchronization signal Ss1 to the sub sensor section 265. Since the delay time xd1 in the main sensor section 255 is set at zero, the main sensor section 255 outputs the synchronization signal Ss1 and outputs the output signal Sd11 to the ECU 85 at the time x11.

Upon detecting the synchronization signal Ss1, the sub sensor section 265 resets the timer 657. Since the delay time xd2 in the sub sensor section 265 is (Ps/2), the sub sensor section 265 outputs the output signal Sd12 to the ECU 85 at time x12 that is (Ps/2) after the time x11. At this time, in the sub sensor section 265, the timer 657 is reset before reaching the set value Vps. Thus, no synchronization signal Ss2 is output.

Similarly, at time x13, the main sensor section 255 outputs the output signal Sd11 and the synchronization signal Ss1, and the sub sensor section 265 resets the timer 657 along with the detection of the synchronization signal Ss1. Further, at time x14 that is (Ps/2) after the time x13, the output signal Sd12 is output. The same applies to time x15 to time x16 and time x19 to time x20.

When the timer 657 reaches the set value Vps prior to the timer 557 at time x17, the sub sensor section 265 resets the timer 657 and outputs the synchronization signal Ss2 to the main sensor section 255. Since the delay time xd2 in the sub sensor section 265 is (Ps/2), the sub sensor section 265 outputs the output signal Sd12 to the ECU 85 at time x18 that is (Ps/2) after the time x17 when the synchronization signal Ss2 is output.

Upon detecting the synchronization signal Ss2, the main sensor section 255 resets the timer 557. Since the delay time xd1 of the main sensor section 255 is zero, the main sensor section 255 outputs the output signal Sd11 to the ECU 85 at the time x17 when the synchronization signal Ss2 is detected. At this time, in the main sensor section 255, the timer 557 is reset before reaching the set value Vps. Thus, no synchronization signal Ss1 is output.

In the present embodiment, the clocking is synchronized between the timers 557, 657 by using the synchronization signals Ss1, Ss2. Thus, the output signals Sd11, Sd12 can be output to the ECU 85 at appropriate timings. Similarly to the above embodiments, the output signals Sd11, Sd12 are alternately output to the ECU 85 at intervals of (Ps/2). Thus, an apparent communication speed can be increased, which enables substantially high-speed communication.

In the present embodiment, the main sensor section 255 and the sub sensor section 265 respectively include the timer 557 and the timer 657, and are not set as "main" and "sub". Thus, the main sensor section 225 and the sub sensor section 265 can output the output signals Sd11, Sd12 in accordance with the clocking of their own timers.

For example, as illustrated in FIG. 17, even when there is an abnormality in the main sensor section 255 and the synchronization signal Ss1 is thus not output from the main sensor section 255, the sub sensor section 265 can continue the output of the output signal Sd12 in accordance with the clocking of its own timer 657 without a command from the ECU 85. Specifically, the synchronization signal Ss2 is output and the timer 657 is reset at time x21, time x23, time x25, time x27, and time x29. The output of the output signal Sd12 is started at time x22, time x24, time x26, time x28, and time x30 which are delayed by (Ps/2) from the output of the synchronization signal Ss2 and the reset of the timer 657. For example, when information indicating the abnormality of the main sensor section 255 is notified from the ECU 85, the output of the synchronization signal Ss2 may be stopped.

Similarly, also when there is an abnormality in the sub sensor section 265, the main sensor section 255 can continue the output of the output signal Sd11 every frame period Ps in accordance with the clocking of its own timer 557.

The main sensor section 255 can transmit and receive the synchronization signals Ss1, Ss2, as the timing signals, for synchronizing the clocking between the timers 557, 657 with the sub sensor section 265 as the other sensor section.

The sub sensor section 265 can transmit and receive the synchronization signals Ss1, Ss2, as the timing signals, for synchronizing the clocking between the timers 557, 657 with the main sensor section 255 as the other sensor section.

In the sensor sections 255, 265, the timers 557, 567 can be synchronized on the basis of the synchronization signals Ss1, Ss2. Thus, the output signals Sd11, Sd12 can be transmitted at appropriate timings.

The same effect as the above embodiments is achieved.

Outputting the output signals Sd11, Sd12 in accordance with the clocking of the timers 557, 657 synchronized on the basis of the synchronization signals Ss1, Ss2 is included in a concept of "determining the output timing of the output signal on the basis of the timing signal acquired from the other sensor section".

The synchronization signals Ss1, Ss2 correspond to "synchronization signal".

Fifth Embodiment

Figure 18:
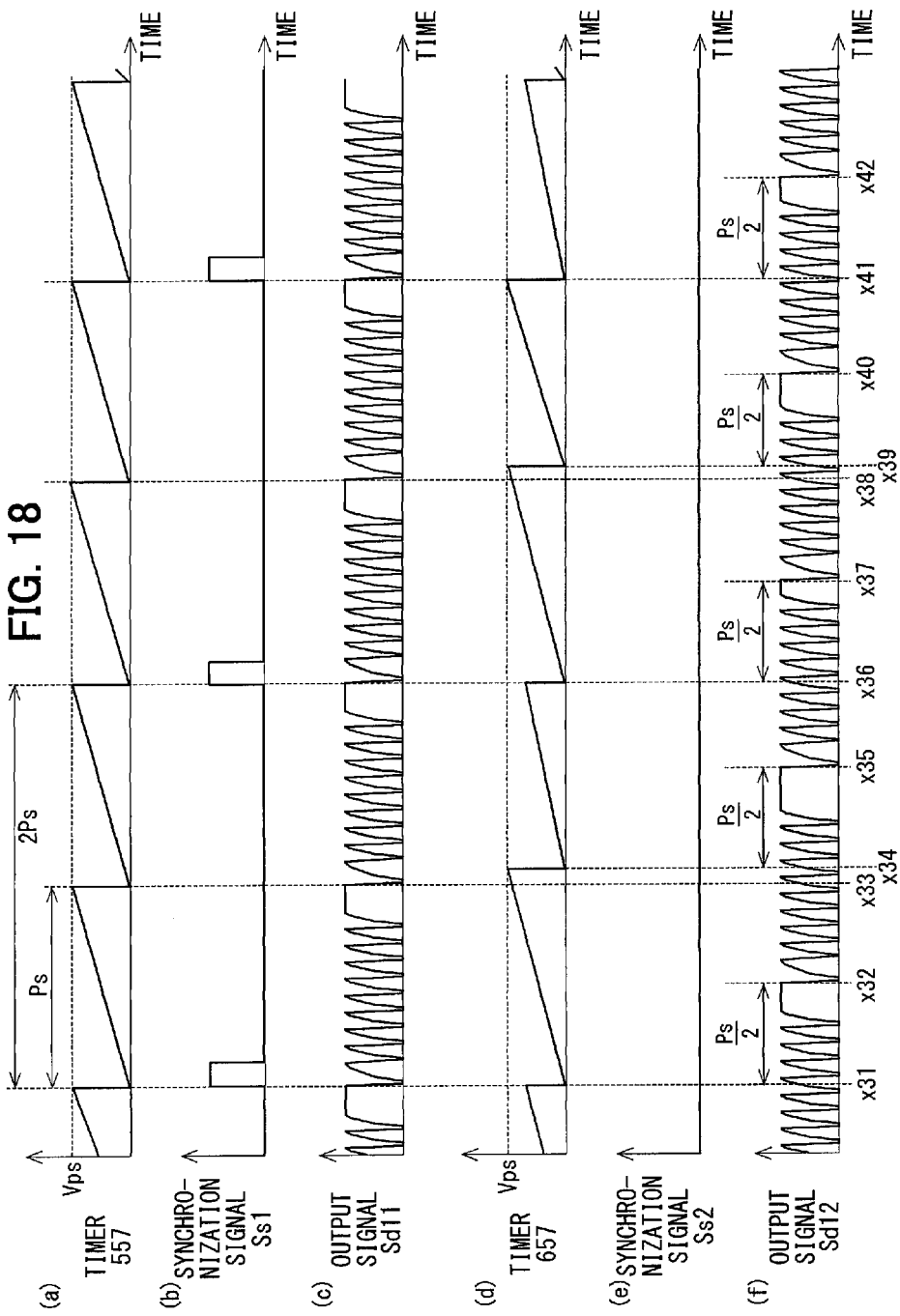
FIG. 18 is a time chart describing communication processing according to a fifth embodiment of the present disclosure.

FIG. 18 illustrates a fifth embodiment of the present disclosure. The present embodiment differs from the fourth embodiment in the output timing of the synchronization signals Ss1, Ss2. In the fourth embodiment, the synchronization signal Ss1, Ss2 is output every frame period Ps. On the other hand, in the present embodiment, the synchronization signal Ss1, Ss2 is output every two frame periods Ps. The output of the synchronization signal Ss1, Ss2 is not limited to once every two periods, and may be once every plurality of periods equal to or more than three periods. That is, the synchronization signal Ss1, Ss2 is not necessarily output every frame period Ps, and may be output once every plurality of periods.

Processes at time x31 and time x32 of FIG. 18 are the same as the processes at the time x11 and the time x12 of FIG. 16. At time x33, the output of the synchronization signal Ss1, Ss2 is omitted. Thus, in the example of FIG. 18, the timer 557 is reset at the time x33, and the timer 657 is reset at time x34 due to clock shift. The output of the output signal Sd11 is started at the time x33. The output of the output signal Sd12 is started at time x35 that is delayed by (Ps/2) from time x34. That is, the output timing of the output signal Sd12 at the time x35 falls behind a timing that is (Ps/2) after the time x33.

At time x36, since the synchronization signal Ss1 is output, the timers 557, 657 are substantially simultaneously reset and synchronized. Thus, time x37 when the output of the output signal Sd12 is started is delayed by (Ps/2) from the time x36 when the output of the output signal Sd11 is started.

When the output of the synchronization signal Ss1, Ss2 is performed once every plurality of periods, the output timings of the output signals Sd11, Sd12 may be shifted in a period during which no synchronization signal Ss1, Ss2 is output. However, the timers 557, 657 are synchronized when the synchronization signal Ss1, Ss2 is again output. Thus, expansion of the shift in the output timings of the output signals Sd11, Sd12 due to clock shift is prevented.

Processes at time x38 to time x42 are the same as the processes at the time x33 to the time x37.

In the present embodiment, the synchronization signal Ss1, Ss2 is transmitted and received once every plurality of transmission periods of the output signals Sd11, Sd12. In the present embodiment, the frame period Ps corresponds to the transmission period.

Accordingly, the processing load on the sensor sections 255, 265 can be reduced.

The same effect as the above embodiments is achieved.

Sixth Embodiment

Figure 19:
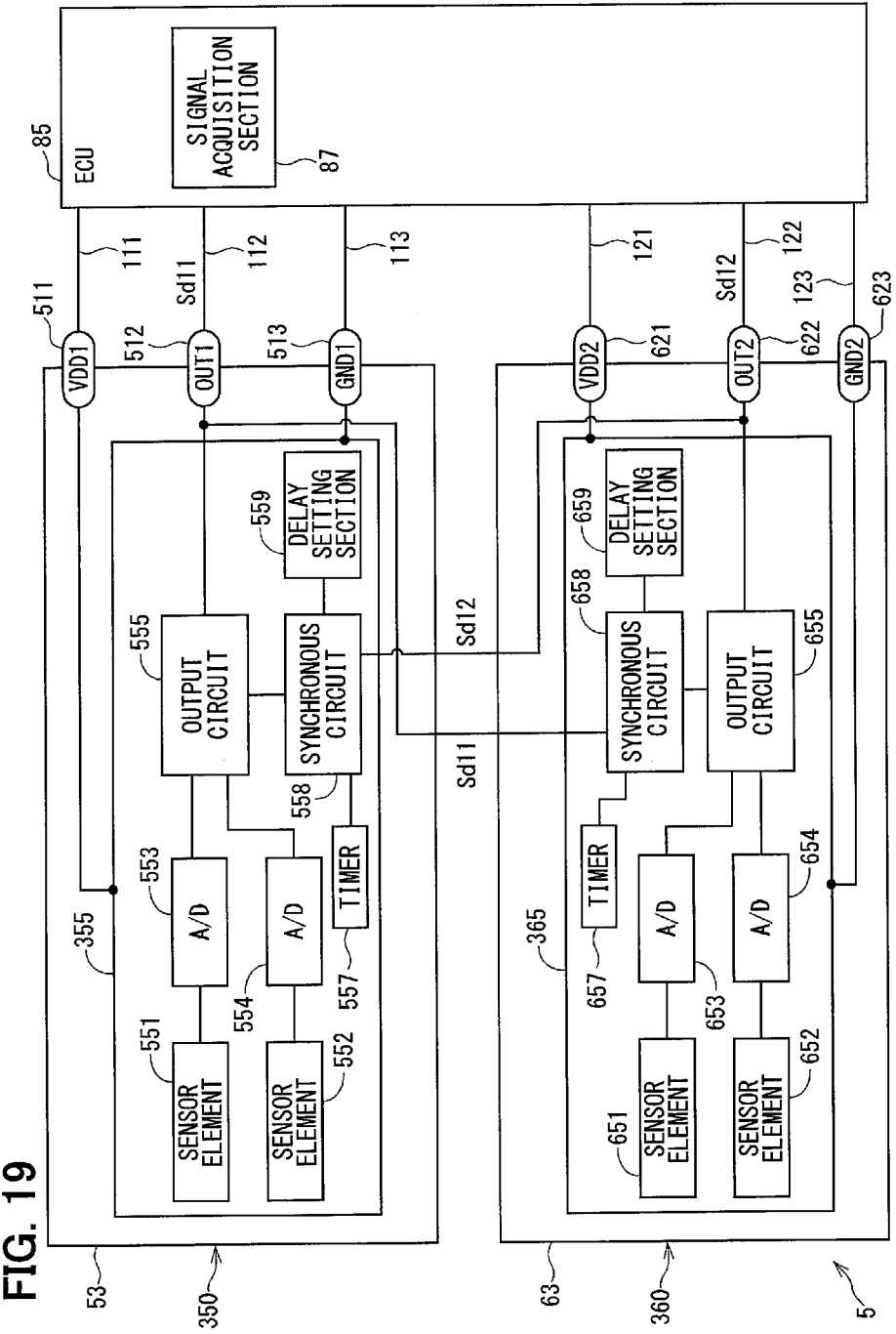
FIG. 19 is a block diagram illustrating a communication device according to a sixth embodiment of the present disclosure.
Figure 20:
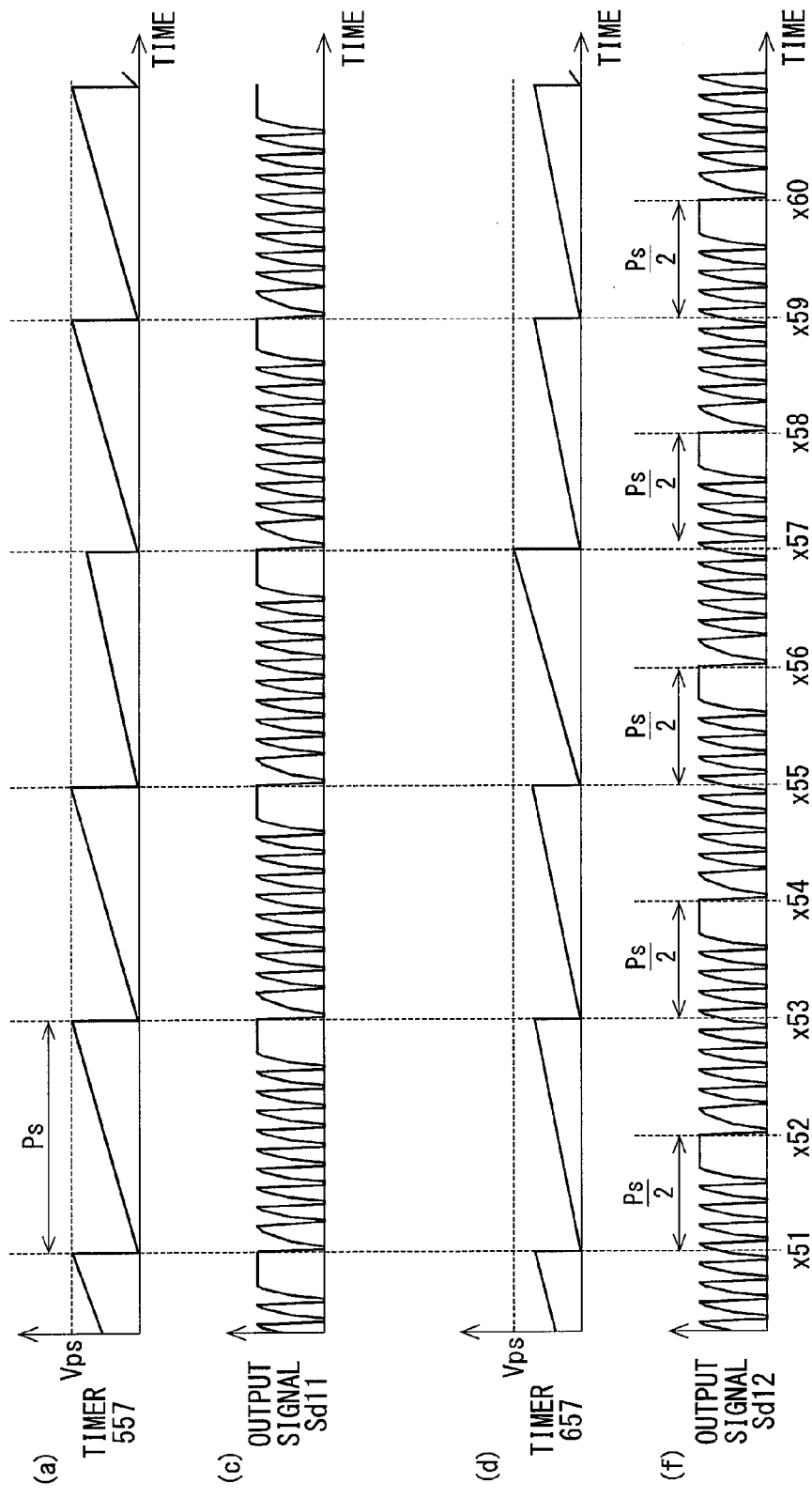
FIG. 20 is a time chart describing communication processing according to the sixth embodiment of the present disclosure.

FIGS. 19 and 20 illustrate a sixth embodiment of the present disclosure. As illustrated in FIG. 19, a communication device 5 of the present embodiment is provided with a main magnetic sensor 350, a sub magnetic sensor 360, and an ECU 85.

A main sensor section 355 of the main magnetic sensor 350 outputs an output signal Sd11, as a timing signal, to a sub sensor section 365. The sub sensor section 365 of the sub magnetic sensor 360 outputs an output signal Sd12, as a timing signal, to the main sensor section 355. That is, in the present embodiment, the output signals Sd11, Sd12 are used as the timing signals without generating the synchronization signals Ss1, Ss2.

In FIG. 19, terminals 524, 614 are omitted.

A delay time xd2 of the sub sensor section 365 is previously stored in a synchronous circuit 558 of the main sensor section 355. A start timing of the next frame period Ps is calculated in accordance with the output signal Sd12 acquired as the timing signal from the sub sensor section 365 and the delay time xd2 in the sub sensor section 365. When the delay time xd2 in the sub sensor section 365 is zero, a start timing of the output signal Sd12 may be regarded as a start timing of the current frame period Ps.

The start timing of the frame period Ps calculated in accordance with the output signal Sd12 and the delay time xd2 can be regarded as a detection timing of the synchronization signal Ss2, for example, in the fourth embodiment. That is, when the calculated start timing is earlier than when a timer 557 reaches a set value Vps, the timer 557 is reset at the calculated start timing, and the output signal Sd11 is output to the ECU 85 in accordance with the calculated start timing and a delay time xd1 of the main sensor section 355.

The delay time xd1 of the main sensor section 355 is previously stored in a synchronous circuit 558 of the sub sensor section 365. A start timing of the next frame period Ps is calculated in accordance with the output signal Sd11 acquired as the timing signal from the main sensor section 355 and the delay time xd1 in the main sensor section 355. When the delay time xd1 in the main sensor section 355 is zero, a start timing of the output signal Sd12 may be regarded as a start timing of the current frame period Ps.

The start timing of the frame period Ps calculated in accordance with the output signals Sd11 and the delay time xd1 can be regarded as a detection timing of the synchronization signal Ss1, for example, in the fourth embodiment. That is, when the calculated start timing is earlier than when a timer 657 reaches the set value Vps, the timer 657 is reset at the calculated start timing, and the output signal Sd12 is output to the ECU 85 in accordance with the calculated start timing and the delay time xd2 of the sub sensor section 365.

As illustrated in FIG. 20, using the output signals Sd11, Sd12 as the timing signals enables the timers 557, 657 to be synchronized similarly to the case when the synchronization signals Ss1, Ss2 are generated and output. Accordingly, the output signals Sd11, Sd12 can be alternately output to the ECU 85 at intervals of (Ps/2).

The example of FIG. 20 differs from the example of FIG. 16 in that the output signals Sd11, Sd12 are used instead of the synchronization signals Ss1, Ss2 to synchronize the timers 557, 657. In the other points, processes at time x51 to time x60 are substantially the same as the processes at the time x11 to the time x20 of FIG. 16.

In FIG. 20, (b) and (e) are skipped so as to correspond to FIG. 16.

In the present embodiment, the sensor sections 355, 365 use the output signals Sd11, Sd12 as the synchronization signals. Accordingly, it is not necessary to separately generate the synchronization signals Ss1, Ss2. Thus, the number of signals can be reduced.

The same effect as the above embodiments is achieved.

Other Embodiments (A) Sensor Section

In the above embodiments, two sensor elements are provided in one sensor section. In another embodiment, the number of sensor elements provided in one sensor section may be one, or three or more. In the above embodiments, detection signals detected by the two sensor elements are output as data signals that are mutually inverted. In another embodiment, data signals according to detection signals detected by the two sensor elements may not be mutually inverted.

In the above embodiments, two sensor sections are provided. In another embodiment, three or more sensor sections may be provided. In this case, output signals output from the respective three or more sensor sections are transmitted at timings shifted from each other by a predetermined period. Although transmission intervals of the output signals output from the respective three or more sensor sections may differ from each other, the output signals are desirably transmitted at regular intervals.

In a plurality of sensor sections, sealing sections may be provided in the respective sensor sections as with the first embodiment, or the sensor sections may be sealed by one sealing section as with the second embodiment.

In the above embodiments, the sensor sections transmit output signals to the control unit at timings shifted from each other by a half period of the output signals. In another embodiment, the sensor sections may transmit output signals to the control unit at timings shifted from each other by a predetermined period that is different from a half period of the output signals and shorter than the length of one period of the output signals.

In the above embodiments, the plurality of sensor sections have the same configuration. In another embodiment, a plurality of sensor sections may have different configurations. In the first embodiment and the second embodiment, for example, the signal generation circuit may be eliminated in the sub sensor section.

In the third embodiment, the output circuit 555 generates the output signal Sd21 on the basis of detection signals that are detected by the sensor elements 551, 552 and A/D converted when the trigger signal Trg1 is transmitted. In another embodiment, detection signals that are detected by the sensor elements 551, 552 and A/D converted may be constantly updated with a predetermined update period that is shorter than the frame period Pt even when no trigger signal is transmitted, and the sensor section may generate the output signal Sd21 using the newest values of the detection signals when the trigger signal Trg1 is transmitted. The same applies to the generation of the output signal Sd22. Not only when the synchronous communication described in the third embodiment is performed, but also when the asynchronous communication described in the first embodiment and the second embodiment is performed, detection signals may be updated with an update period that is shorter than the frame period, and the output signal may be generated using the newest detection signals.

In the above embodiments, each sensor element is a Hall element. In another embodiment, a sensor element may be a magnetism detection element other than a Hall element or an element that detects a change other than a change in the magnetism. Each sensor section of the above embodiments is used in the torque sensor which detects the steering torque. In another embodiment, a sensor section may be, for example, a sensor other than a torque sensor such as a pressure sensor which detects pressure. In the above embodiments, a detection target is a magnetism collection module. In another embodiment, a detection target is not limited to a magnetism collection module, and may be any target.

In the above embodiments, each magnetic sensor is a so-called small outline package (SOP) type which is a package including terminals formed on both sides of a sealing section. In another embodiment, terminals may be formed in places other than the first side face and the second side face as with a quad flat package (QFP) type in which terminals are formed on four sides of a sealing section.

(B) Communication Device

In the above embodiments, an example of SENT communication has been described as a communication method between a sensor section and a control unit. In another embodiment, a communication method is not limited to SENT communication and may be any communication method, for example, serial peripheral interface (SPI) communication.

In the above embodiments, the communication device is applied to an electric power steering device. In another embodiment, the communication device may be applied to a vehicle-mounted device other than an electric power steering device or may be applied to another device that is not mounted on a vehicle.

It is noted that a flowchart or the processing of the flowchart in the present application includes sections (also referred to as steps), each of which is represented, for instance, as S101. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A communication device comprising:
   a plurality of sensors, each of which includes at least one sensor element that detects information relating to a single detection target and an output circuit that generates and transmits an output signal based on a detection signal of the sensor element; and
   a controller that acquires output signals from the plurality of sensors, wherein:
   an output signal of one of the sensors is transmitted to the controller at an output timing that is shifted from an output timing of an output signal of another one of the sensors, the output timing of the one of the sensors being shifted by a predetermined period that is shorter than a length of one period of the output signal of the one of the sensors, from another output timing when another one of the sensors transmits the output signal, wherein
   when a part of the sensors fails, the output circuit of a failed sensor stops transmitting the output signal, and the output circuit of a normal sensor transmits the output signal with a predetermined period.

2. The communication device according to claim 1, wherein:
   at least one of the sensors determines the output timing of the output signal based on a timing signal transmitted from another one of the sensors.

3. The communication device according to claim 2, wherein:
   the sensors include a main sensor that transmits the timing signal to a sub sensor that is one of the sensors other than the main sensor; and
   the sub sensor transmits the output signal to the controller in response to the timing signal from the main sensor.

4. The communication device according to claim 2, wherein:
   each of the sensors transmits and receives a synchronization signal as the timing signal for synchronizing a clock of a timer in another one of the sensors.

5. The communication device according to claim 4, wherein:
   the synchronization signal is transmitted and received once every plurality of transmission periods of the output signal.

6. The communication device according to claim 4, wherein:
   each of the sensors uses the output signal as the synchronization signal.

7. The communication device according to claim 2, wherein:
   each of the sensors further includes:
   a sealing section that seals the sensor;
   a terminal group, which projects from a first side face of the sealing section, defined as a first terminal group; and
   a terminal group, which projects from a second side face of the sealing section, defined as a second terminal group;
   the second side face is located opposite to the first side face; and
   each of the first terminal group and the second terminal group includes a reception terminal for receiving the timing signal and a transmission terminal for transmitting the timing signal.

8. The communication device according to claim 7, wherein:
   a n-th terminal from a first end of the sealing section is the reception terminal in the first terminal group;
   a m-th terminal from the first end is the transmission terminal in the first terminal group;
   a n-th terminal from the first end of the sealing section is the transmission terminal in the second terminal group; and
   a m-th terminal from the first end is the reception terminal in the second terminal group.

9. The communication device according to claim 1, wherein:
   the controller transmits a timing signal that indicates a timing of transmitting the output signal to each of the sensors.

10. The communication device according to claim 1, wherein:
    the at least one sensor element includes a plurality of sensor elements; and
    the output circuit generates the output signal according to detection signals of the plurality of sensor elements.

11. The communication device according to claim 1, wherein:
    the output signals from the sensors are transmitted in such a manner that the controller acquires the output signals at timings with regular intervals.

12. The communication device according to claim 1, wherein:
    the sensor element is a magnetic detector that detects a change in a magnetic flux of the detection target.

13. The communication device according to claim 12, wherein:
    the sensor element is the magnetic detector that detects the change in the magnetic flux corresponding to a steering torque; and
    the controller calculates the steering torque based on the output signal, and controls a drive of a motor of an electric power steering device according to a calculated steering torque.

* * * * *